US007990822B2

(12) United States Patent
Tanaka et al.

(10) Patent No.: US 7,990,822 B2
(45) Date of Patent: Aug. 2, 2011

(54) SOUND RECORDING/REPRODUCING METHOD AND APPARATUS

(75) Inventors: Katsuaki Tanaka, Hamamatsu (JP);
Sadayuki Narusawa, Hamamatsu (JP)

(73) Assignee: Yamaha Corporation, Hamamatsu-shi (JP)

(*) Notice: Subject to any disclaimer, the term of this patent is extended or adjusted under 35 U.S.C. 154(b) by 556 days.

(21) Appl. No.: 10/643,422

(22) Filed: Aug. 19, 2003

(65) Prior Publication Data
US 2004/0037183 A1    Feb. 26, 2004

(30) Foreign Application Priority Data

Aug. 21, 2002  (JP) ................ 2002-240358
Aug. 27, 2002  (JP) ................ 2002-246827

(51) Int. Cl.
G11B 20/10  (2006.01)
G11B 7/0045  (2006.01)

(52) U.S. Cl. ............... 369/47.16; 369/59.25; 369/59.26; 709/217

(58) Field of Classification Search ............... 369/47.16, 369/44.28, 44.34, 59.25, 52, 46, 98, 30.05, 369/30.06, 59.26; 386/52, 46, 98; 455/557, 455/556.1, 559; 725/134; 84/601, 602, 631, 84/600, 632; 709/217
See application file for complete search history.

(56) References Cited

U.S. PATENT DOCUMENTS

| | | | |
|---|---|---|---|
| 4,868,869 A * | 9/1989 | Kramer | 84/622 |
| 5,880,386 A * | 3/1999 | Wachi et al. | 84/601 |
| 6,792,007 B1 * | 9/2004 | Hamada et al. | 725/134 |
| 6,879,843 B1 * | 4/2005 | Kim | 455/557 |
| 7,065,287 B1 * | 6/2006 | Heredia et al. | 386/52 |

FOREIGN PATENT DOCUMENTS

| | | |
|---|---|---|
| JP | 61-77184 | 4/1986 |
| JP | 2-60400 | 5/1990 |
| JP | 4-135795 | 12/1992 |
| JP | 05-021366 | 3/1993 |
| JP | 5-21366 | 3/1993 |
| JP | 7-283756 | 10/1995 |
| JP | 07-283756 | 10/1995 |
| JP | 8-96488 | 4/1996 |
| JP | 9-171664 | 6/1997 |

(Continued)

OTHER PUBLICATIONS

Office Action: Notice of Reason for Refusal for Japanese Patent Application No. 2002-240358 (Dated: Sep. 20, 2005).
Office Action: Notice of Reason for Refusal for Japanese Patent Application No. 2002-246827 (Dated: Oct. 31, 2006).
Office Action: Notice of Reason for Refusal for Japanese Patent Application No. 2002-246827 (Dated: Nov. 13, 2007).

(Continued)

*Primary Examiner* — William J Klimowicz
*Assistant Examiner* — Kim-Kwok Chu
(74) *Attorney, Agent, or Firm* — Pillsbury Winthrop Shaw Pittman LLP

(57) ABSTRACT

Recording/reproducing apparatus records attribute information on sound data of a music piece onto a recording medium, and creates a rule table associating the attribute information and DSP program parameters. The recording/reproducing apparatus acquires, from the table, any of DSP program parameters that corresponds to the attribute information, and sets the DSP program parameter in the amplifier apparatus. The recording/reproducing apparatus also detects a recorded level of each succession of sound data to be recorded onto the medium, and then records the detected recorded level onto the medium in association with the sound data. Also, the recording/reproducing apparatus acquires a recorded level corresponding to a succession of the sound data to be reproduced, and adjusts, on the basis of the acquired recorded level, an output level of the succession of the sound.

12 Claims, 18 Drawing Sheets

FOREIGN PATENT DOCUMENTS

| | | |
|---|---|---|
| JP | 9-180109 | 7/1997 |
| JP | 2000-235772 | 8/2000 |
| JP | 2001-005497 | 1/2001 |
| JP | 2001-143208 | 5/2001 |
| JP | 2001-312877 | 9/2001 |
| JP | 2004-071128 | 3/2004 |

OTHER PUBLICATIONS

Office Action: Decision of Final Rejection for Japanese Patent Application No. 2002-240358 (Dated: Dec. 20, 2005).

Masashi Hukazawa, "Notice of Reason for Refusal," Japanese Office Action, Japanese Patent Office (Japan), p. all, (Apr. 11, 2006).

\* cited by examiner

FIG. 4A

101. MUSIC PIECE RULE TABLE

| MUSIC PIECE ID | DSP PROGRAM PARAMETER | MODEL ID |
|---|---|---|
| 1 | HALL | 1 |
| 4 | CHURCH | 1 |
| 8 | JAZZ | 1 |
| ⋮ | ⋮ | ⋮ |

FIG. 4B

102. ALBUM RULE TABLE

| ALBUM ID | DSP PROGRAM PARAMETER | MODEL ID |
|---|---|---|
| 2 | OFF | 1 |
| 5 | ADVENTURE | 1 |
| 9 | GENERAL | 1 |
| ⋮ | ⋮ | ⋮ |

FIG. 4C

103. ARTIST RULE TABLE

| ARTIST ID | DSP PROGRAM PARAMETER | MODEL ID |
|---|---|---|
| 3 | HALL | 1 |
| 6 | JAZZ | 1 |
| 7 | OFF | 1 |
| ⋮ | ⋮ | ⋮ |

FIG. 4D

104. GENRE RULE TABLE

| GENRE ID | DSP PROGRAM PARAMETER | MODEL ID |
|---|---|---|
| 2 | GENERAL | 1 |
| 3 | HALL | 1 |
| 5 | JAZZ | 1 |
| ⋮ | ⋮ | ⋮ |

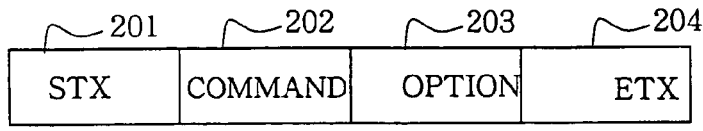
FIG. 6A
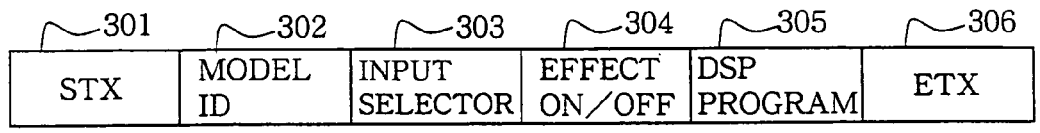
FIG. 6B
105. DSP PROGRAM CODE TABLE
| DSP PROGRAM CODE | MODEL ID "1" DSP PROGRAM PARAMETER | MODEL ID "2" DSP PROGRAM PARAMETER |
|---|---|---|
| 0 | HALL A | HALL |
| 1 | HALL B | CHURCH |
| 2 | CHURCH A | JAZZ |
| 3 | CHURCH B | SCI – FI |
| 4 | JAZZ | ADVENTURE |
| 5 | ROCK | GENERAL |
| 6 | SCI – FI | — |
| 7 | ADVENTURE | — |
| 8 | GENERAL | — |
FIG. 7
106. DSP PROGRAM CODE TABLE
| DSP PROGRAM CODE | DSP PROGRAM PARAMETER |
|---|---|
| 0 | HALL A |
| 1 | HALL B |
| 2 | CHURCH A |
| 3 | CHURCH B |
| 4 | JAZZ |
| 5 | ROCK |
| 6 | SCI – FI |
| 7 | ADVENTURE |
| 8 | GENERAL |
FIG. 8

107. INPUT CODE TABLE

| INPUT CODE | MODEL ID "1" INPUT SELECTOR SELECTION INPUT TERMINAL | MODEL ID "2" INPUT SELECTOR SELECTION INPUT TERMINAL |
|---|---|---|
| 0 | CD | CD |
| 1 | MD | MD |
| 2 | DVD | DVD |
| 3 | TUNER | VIDEO |
| 4 | VIDEO1 | V – AUX |
| 5 | VIDEO2 | — |
| 6 | V – AUX | — |

FIG. 9

108. INPUT CODE TABLE

| INPUT CODE | INPUT SELECTOR SELECTION INPUT TERMINAL |
|---|---|
| 0 | CD |
| 1 | MD |
| 2 | DVD |
| 3 | TUNER |
| 4 | VIDEO1 |
| 5 | VIDEO2 |
| 6 | V – AUX |

FIG. 10

109. DSP PROGRAM ASSOCIATING TABLE

| MAJOR CLASS OF DSP PROGRAM PARAMETER | MODEL ID "1" DSP PROGRAM PARAMETER | MODEL ID "2" DSP PROGRAM PARAMETER |
|---|---|---|
| HALL | HALL A | HALL |
| | FALL B | — |
| CHURCH | CHURCH A | — |
| | CHURCH B | — |
| | — | CHURCH |
| JAZZ | JAZZ | JAZZ |
| ROCK | ROCK | — |
| | — | ROCK |
| CINEMA | SCI – FI | SCI – FI |
| | ADVENTURE | ADVENTURE |
| | GENERAL | GENERAL |
| ⋮ | ⋮ | ⋮ |

FIG. 12

101a. MUSIC PIECE RULE TABLE

| MUSIC PIECE ID | PROCESSING START TIME | DSP PROGRAM PARAMETER | MODEL ID |
|---|---|---|---|
| 1 | 0:00 | SCI-FI | 1 |
|  | 2:30 | OFF | 1 |
|  | 4:10 | GENERAL | 1 |
| 3 | 0:00 | JAZZ | 1 |
| 7 | 0:00 | HALL A | 1 |
|  | 1:30 | HALL B | 1 |
| ⋮ | ⋮ | ⋮ | ⋮ |

110. RULE TABLE

| MUSIC PIECE ID | FORMAT | BIT RATE | GENRE ID | DSP PROGRAM PARAMETER | MODEL ID |
|---|---|---|---|---|---|
| 1 | MP3 | 128kbps | 2 | EQUALIZE A | 1 |
| 4 | MP3 | 192kbps | 3 | EQUALIZE B | 1 |
| ⋮ | ⋮ | ⋮ | ⋮ | ⋮ | ⋮ |

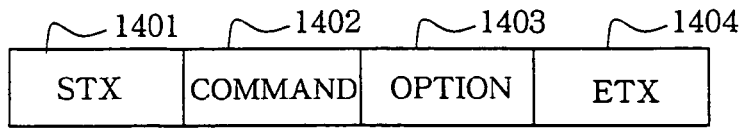
FIG. 25A
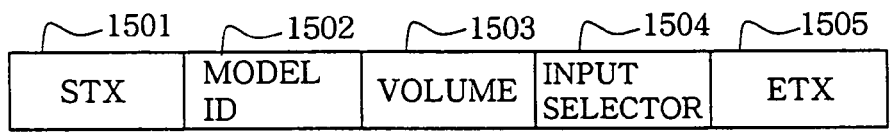
FIG. 25B
1301. INPUT CODE TABLE
| INPUT CODE | MODEL ID "1" INPUT SELECTOR SELECTION INPUT TERMINAL | MODEL ID "2" INPUT SELECTOR SELECTION INPUT TERMINAL |
|---|---|---|
| 0 | CD | CD |
| 1 | MD | MD |
| 2 | DVD | DVD |
| 3 | TUNER | VIDEO |
| 4 | VIDEO 1 | V – AUX |
| 5 | VIDEO 2 | — |
| 6 | V – AUX | — |
FIG. 26
1302. INPUT CODE TABLE
| INPUT CODE | INPUT SELECTOR SELECTION INPUT TERMINAL |
|---|---|
| 0 | CD |
| 1 | MD |
| 2 | DVD |
| 3 | TUNER |
| 4 | VIDEO 1 |
| 5 | VIDEO 2 |
| 6 | V – AUX |
FIG. 27

SOUND RECORDING/REPRODUCING METHOD AND APPARATUS

BACKGROUND OF THE INVENTION

The present invention relates to a sound recording/reproducing method and apparatus for digitally recording audio or sound signals onto a recording medium, such as a memory or hard disk, and reproducing the recorded signals from the recording medium.

In recent years, sound recording/reproducing apparatus have been used widely which are capable of digitally recording audio or sound signals onto a recording medium, such as a memory or hard disk, and reproducing the recorded signals from the recording medium.

However, when any of various kinds of sound filed processes or frequency characteristic processes is to be performed, using a digital signal processor (hereinafter also referred to as a "DSP"), in accordance with characteristics of a music piece to be reproduced, such sound recording/reproducing apparatus would present the problem that parameter settings of the DSP have to be changed per music piece and such parameter setting changing tends to be extremely complicated and burdensome operations for a user.

Generally, the recording capacity of such sound recording/reproducing apparatus increases as the capacity of the recording medium used therein increases. By virtue of an increase in the capacity of recording media today, the number of music pieces recordable by the sound recording/reproducing apparatus is also increasing. However, as the number of music pieces recordable by the sound recording/reproducing apparatus increases, there occurs a greater likelihood of music pieces being recorded from various different sound sources onto the recording medium of the apparatus, which would result in undesired unevenness in recorded level of the music pieces on the recording medium and hence great differences in sound volume among the music pieces when the music pieces are reproduced from the recording medium.

For example, in cases where music pieces are recorded onto the recording medium of the apparatus from a single CD (Compact Disk) having these music pieces recorded thereon at a substantially uniform level, there would be produced no great unevenness in recorded level of the music pieces on the apparatus' recording medium. However, in cases where music pieces are recorded onto the recording medium from a plurality of CDs, there would be created a possibility of sound volume, with which the recorded music pieces are reproduced by the sound recording/reproducing apparatus, greatly differing among the music pieces due to a difference in original recorded level among the CDs.

Although some of the known sound recording/reproducing apparatus are designed to allow the user to adjust the recorded level at the time of recording, adjusting the recorded level at the time of recording tends to be extremely complicated and burdensome operations for the user. Further, if such recorded level adjustment is applied to digital recording, there tends to be created a likelihood of the sound quality being degraded. If, on the other hand, the sound volume is adjusted manually at the time of reproduction, the recorded level difference among the music pieces on the recording medium can be absorbed; however, thus adjusting the reproduced sound volume per music piece tends to be extremely complicated and burdensome operations for the user as in the case of the above-mentioned level adjustment at the time of recording.

As a solution to the above-discussed inconvenience of recorded level unevenness among music pieces, there has been proposed a sound reproducing method which is arranged to detect an average of respective recorded levels of music pieces by reproducing the sound data of the music pieces from the recording medium at high speed and then adjust reproducing sound volume on the basis of the detected average level (Japanese Patent Laid-open Publication No. HEI-5-128731). However, with the proposed reproducing method, where it is necessary to detect the average of recorded levels prior to reproduction of the music pieces, a relatively long time is required before the music pieces are actually reproduced.

SUMMARY OF THE INVENTION

In view of the foregoing, it is an object of the present invention to provide an improved sound recording/reproducing method and apparatus which can significantly reduce loads on a user necessary for setting a DSP employed in the apparatus.

It is another object of the present invention to provide an improved sound recording/reproducing method and apparatus which can effectively absorb unevenness in recorded level among music pieces on a recording medium employed therein and can promptly reproduce any desired one of the recorded music pieces.

According to an aspect of the present invention, there is provided a sound recording/reproducing method, which comprises: an attribute information recording step of recording, onto a recording medium, attribute information on sound data of a music piece that are to be recorded onto the recording medium; a rule table creation step of creating a rule table that associates the attribute information and DSP program parameters each designating, to a digital signal processor (DSP) of an amplifier apparatus, a sound field process or frequency characteristic process to be performed; a DSP program parameter acquisition step of, at a time of reproduction when sound data of a music piece to be reproduced, read out from the recording medium, are to be outputted to the amplifier apparatus, acquiring, from the recording medium, the attribute information on the sound data of the music piece to be reproduced and also acquiring, from the rule table, any of the DSP program parameters that corresponds to the attribute information; and a DSP program parameter setting step of setting the DSP program parameter, acquired from the rule table, in the digital signal processor of the amplifier apparatus.

The present invention also provides a sound recording/reproducing method, which comprises: an attribute information recording step of recording, onto a recording medium, attribute information on sound data of a music piece that are to be recorded onto the recording medium; a rule table creation step of creating a rule table that associates the attribute information, DSP program parameters each designating, to a digital signal processor of an amplifier apparatus, a sound field process or frequency characteristic process to be performed and processing start times each designating a time when the process is to be started; a DSP program parameter acquisition step of, at a time of reproduction when sound data of a music piece to be reproduced, read out from the recording medium, are to be outputted to the amplifier apparatus, acquiring, from the rule table, any of the DSP program parameters that corresponds to the attribute information on the sound data and corresponds to any one of the processing start times that has coincided with an elapsed reproducing time of the sound data; and a DSP program parameter setting step of setting the DSP program parameter, acquired from the rule table, in the digital signal processor of the amplifier apparatus.

In a case where the amplifier apparatus that was an object of control at the time of the creation of the rule table and the amplifier apparatus that is an object of control (i.e., to be controlled) at the time of sound data reproduction are of different models, the DSP program parameter acquisition step may acquire a DSP program parameter, corresponding to the DSP program parameter acquired from the rule table and also corresponding to the model of the amplifier apparatus to be controlled at the time of sound data reproduction, from a DSP program table that associates DSP program parameters of various amplifier apparatus models.

In an embodiment of the sound recording/reproducing method, when a change has been made to the sound field process or frequency characteristic process of the amplifier apparatus during reproduction of the sound data of a music piece, there is performed a learning step of registering, in the rule table, a DSP program parameter indicative of the changed sound field process or frequency characteristic process in association with the attribute information of the sound data being currently reproduced. Alternatively, when a change has been made to the sound field process or frequency characteristic process of the amplifier apparatus during reproduction of the sound data of the music piece, there may be performed a learning step of determining, as a processing start time, an elapsed reproducing time, up to the time point of the change, of the sound data of the music piece and then registering, in the rule table, a DSP program parameter indicative of the changed sound field process or frequency characteristic process and the determined processing time in association with the attribute information of the sound data being currently reproduced.

In an embodiment of the sound recording/reproducing method, the attribute information on the sound data of the music piece includes music piece information identifying the music piece, album information identifying an album to which the music piece belongs, artist information identifying an artist of the music piece, and genre information identifying a musical genre of the music piece.

In an embodiment of the sound recording/reproducing method, the attribute information on the sound data of the music piece includes compression scheme information indicative of a compression scheme with which the sound data are recorded on the recording medium.

According to another aspect of the present invention, there is provided a sound recording/reproducing apparatus, which comprises: a recording medium on which sound data can be recorded and reproduced; an attribute information recording section that records, onto the recording medium, attribute information on sound data of a music piece that are to be recorded onto the recording medium; a rule table creation section that creates a rule table that associates the attribute information and DSP program parameters each designating, to a digital signal processor of an amplifier apparatus, a sound field process or frequency characteristic process to be performed; a DSP program parameter acquisition section that, at a time of reproduction when sound data of a music piece to be reproduced, read out from the recording medium, are to be outputted to the amplifier apparatus, acquires, from the recording medium, the attribute information on the sound data and also acquires, from the rule table, any of the DSP program parameters that corresponds to the attribute information; and a DSP program parameter setting section that sets the DSP program parameter, acquired from the rule table, in the digital signal processor of the amplifier apparatus.

The present invention also provides a sound recording/reproducing apparatus, which comprises: a recording medium on which sound data can be recorded and reproduced; an attribute information recording section that records, onto the recording medium, attribute information on sound data of a music piece that are to be recorded onto the recording medium; a rule table creation section that creates a rule table that associates the attribute information, DSP program parameters each designating, to a digital signal processor of an amplifier apparatus, a sound field process or frequency characteristic process to be performed and processing start times each designating a time when the process is to be started; a DSP program parameter acquisition section that, at a time of reproduction when sound data of a music piece to be reproduced, read out from the recording medium, are to be outputted to the amplifier apparatus, acquires, from the rule table, any of the DSP program parameters that corresponds to the attribute information on the sound data and corresponds to any one of the processing start times that has coincided with an elapsed reproducing time of the sound data; and a DSP program parameter setting section that sets the DSP program parameter, acquired from the rule table, in the digital signal processor of the amplifier apparatus.

In a case where the amplifier apparatus that was an object of control at the time of the creation of the rule table and the amplifier apparatus to be controlled at the time of sound data reproduction are of different models, the DSP program parameter acquisition section may acquire a DSP program parameter, corresponding to the DSP program parameter acquired from the rule table and also corresponding to the amplifier apparatus to be controlled at the time of sound data reproduction, from a DSP program table that associate DSP program parameters of various amplifier apparatus models, and it may then pass the thus-acquired DSP program parameter to the DSP program parameter setting section.

In an embodiment, the sound recording/reproducing apparatus also comprises a learning section that, when a change has been made to the sound field process or frequency characteristic process of the amplifier apparatus during reproduction of the sound data of the music piece, registers, in the rule table, a DSP program parameter indicative of the changed sound field process or frequency characteristic process in association with the attribute information of the sound data being currently reproduced. Alternatively, when a change has been made to the sound field process or frequency characteristic process of the amplifier apparatus during reproduction of the sound data of the music piece, the learning section may determine, as a processing start time, an elapsed reproducing time, up to the time point of the change, of the sound data of the music piece and then register, in the rule table, a DSP program parameter indicative of the changed sound field process or frequency characteristic process in association with the attribute information of the sound data being currently reproduced.

In an embodiment of the sound recording/reproducing apparatus, the attribute information on the sound data of the music piece includes music piece information identifying the music piece, album information identifying an album to which the music piece belongs, artist information identifying an artist of the music piece, and genre information identifying a musical genre of the music piece.

Further, in an embodiment of the sound recording/reproducing apparatus, the attribute information on the sound data of the music piece includes compression scheme information indicative of a compression scheme with which the sound data are recorded on the recording medium.

According to still another important aspect of the present invention, there is provided a sound recording/reproducing method, which comprises: a recorded level recording step of, when a succession of sound data are to be recorded onto a recording medium, detecting a recorded level of the succession of the sound data and recording, onto the recording medium, the detected recorded level in association with the succession of the sound data; and an output level control step of, when sound data read out from the recording medium are to be output for reproduction, acquiring a recorded level corresponding to a succession of the sound data to be reproduced and adjusting, on the basis of the acquired recorded level and a reference recorded level, an output level of the succession of the sound data to be reproduced. With such arrangements, the present invention can adjust the output level of the sound data as if the sound data had been recorded at the reference recorded level. Here, the "succession of sound data" means an integral set of sound data that are recorded or reproduced together as a unit, such as sound data of a music piece.

The present invention also provides a sound recording/reproducing method, which comprises: a recorded level recording step of, when a succession of sound data are to be recorded onto a recording medium, detecting a recorded level of the succession of the sound data and recording, onto the recording medium, the detected recorded level in association with the succession of the sound data; and a volume control step of, when sound data read out from the recording medium are to be output to an amplifier apparatus having a volume control capable of being controlled from outside, acquiring a recorded level corresponding to a succession of the sound data to be reproduced and controlling the volume control of the amplifier apparatus on the basis of the acquired recorded level and a reference recorded level. With such arrangements, the present invention can adjust the volume control of the amplifier apparatus as if the sound data of a music piece to be reproduced had been recorded at the reference recorded level.

In an embodiment, a predetermined value is set as the reference recorded level. Alternatively, the reference recorded level may be determined on the basis of a plurality of recorded levels corresponding to a plurality of successions of sound data to be reproduced.

According to still another aspect of the present invention, there is provided a sound recording/reproducing apparatus, which comprises: a recording medium on which sound data can be recorded and reproduced; a recorded level detection section that, when a succession of sound data are to be recorded onto the recording medium, detects a recorded level of the succession of the sound data; a recorded level detection section that records the recorded level, detected by the recorded level detection section, onto the recording medium in association with the succession of the sound data; and a recorded level acquisition section that, at a time of reproduction when sound data read out from the recording medium are to be output, acquires a recorded level corresponding to a succession of the sound data to be reproduced; and an output level control section that adjusts, on the basis of the acquired recorded level and a reference recorded level, an output level of the succession of the sound data to be reproduced.

The present invention also provides a sound recording/reproducing apparatus, which comprises: a recording medium on which sound data can be recorded and reproduced; a recorded level detection section that, when a succession of sound data are to be recorded onto the recording medium, detects a recorded level of the succession of the sound data; a recorded level detection section that records the recorded level, detected by the recorded level detection section, onto the recording medium in association with the succession of the sound data; and a recorded level acquisition section that, at a time of reproduction when sound data read out from the recording medium are to be output to an amplifier apparatus having a volume control capable of being controlled from outside, acquires a recorded level corresponding to a succession of the sound data to be reproduced; and a volume control section that controls the volume control of the amplifier apparatus on the basis of the acquired recorded levels and a reference recorded level.

As in the case of the sound recording/reproducing method, a predetermined value may be set as the reference recorded level. Alternatively, the reference recorded level may be determined on the basis of a plurality of recorded levels corresponding to a plurality of successions of sound data to be reproduced.

The following will describe embodiments of the present invention, but it should be appreciated that the present invention is not limited to the described embodiments and various modifications of the invention are possible without departing from the basic principles of the invention. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which:

FIGS. 4A to 4D are diagrams showing examples of rule tables provided in the sound recording/reproducing apparatus of FIG. 1;

FIG. 6A is a diagram showing a format of a control command given from the sound recording/reproducing apparatus of FIG. 1, and FIG. 6B is a diagram showing a format of a message given from an amplifier apparatus of FIG. 1;

FIG. 7 is a diagram showing an example of a DSP program code table provided in the sound recording/reproducing apparatus of FIG. 1;

FIG. 8 is a diagram showing an example of a DSP program code table provided in the amplifier apparatus of FIG. 1;

FIG. 9 is a diagram showing an example of an input code table provided in the sound recording/reproducing apparatus of FIG. 1;

FIG. 10 is a diagram showing an example of an input code table provided in the amplifier apparatus of FIG. 1;

FIG. 12 is a diagram showing an example of a DSP program associating table provided in the sound recording/reproducing apparatus of FIG. 1;

FIG. 25A is a diagram showing a format of a control command given from the sound recording/reproducing apparatus of FIG. 23, and FIG. 25B is a diagram showing a format of a message given from an amplifier apparatus of FIG. 23;

FIG. 26 is a diagram showing an example of an input code table provided in the sound recording/reproducing apparatus of FIG. 23; and FIG. 27 is a diagram showing an example of an input code table provided in the amplifier apparatus of FIG. 23.

DETAILED DESCRIPTION OF THE INVENTION

First Embodiment

Figure 1:
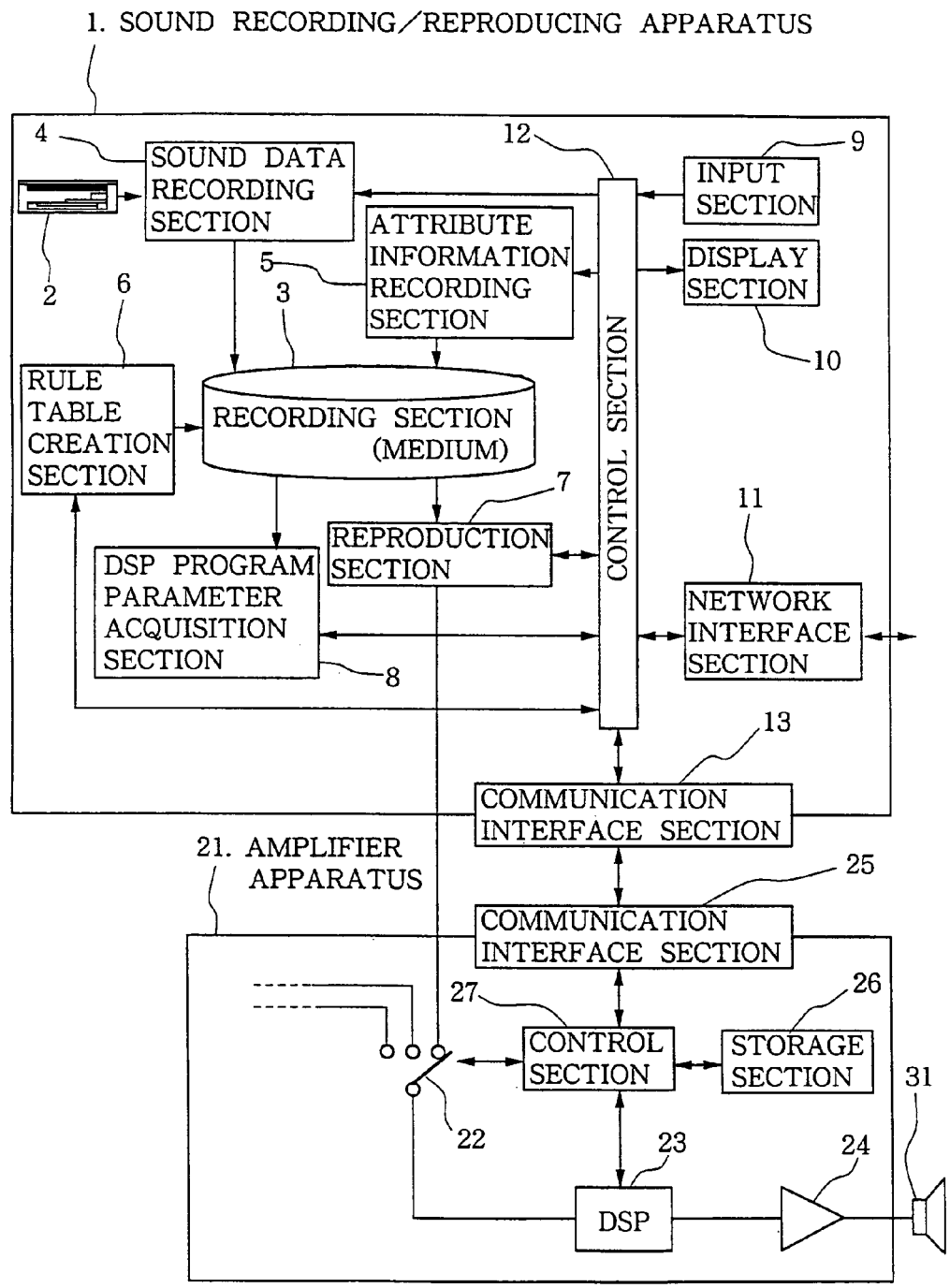
FIG. 1 is a block diagram showing a general setup of a sound recording/reproducing system in accordance with a first embodiment of the present invention.

FIG. 1 is a block diagram showing a general setup of a sound recording/reproducing system in accordance with a first embodiment of the present invention. This sound recording/reproducing system includes a sound recording/reproducing apparatus 1, an amplifier apparatus 21, and a speaker 31. The sound recording/reproducing apparatus 1 has a function for obtaining a status from the amplifier apparatus 21, and a control function for controlling the amplifier apparatus 21. The amplifier apparatus 21 performs a sound field process or frequency characteristic process that can be controlled from outside the apparatus 21, and the speaker 31 is driven by the amplifier apparatus 21.

The sound recording/reproducing apparatus 1 includes a CD drive device 2, a recording medium 3, such as a hard disk or memory, on which sound data can be recorded and reproduced, a sound data recording section 4 for recording sound data onto the recording medium 3, and an attribute information recording section 5 for recording attribute information of a music piece onto the recording medium 3 in association with the sound data of the music piece. The sound recording/reproducing apparatus 1 also includes a rule table creation section 6 for creating a rule table that associates DSP program parameters each designating, to a digital signal processor (DSP) of the amplifier apparatus 21, a sound field process or frequency characteristic process to be executed and the attribute information of music pieces. The sound recording/reproducing apparatus 1 further includes a reproduction section 7 for reading out the sound data from the recording medium 3 for reproduction of the sound data, a DSP program parameter acquisition section 8 for acquiring, from the recording medium 3, the attribute information of sound data to be reproduced and acquiring, from the rule table, a DSP program parameter corresponding to the attribute information, and an input section 9 for a user to give an instruction to the sound recording/reproducing apparatus 1. Further, the sound recording/reproducing apparatus 1 includes a display section 10 for visually displaying information to the user, a network interface section (NI) 11 for connecting to the Internet, a control section 12 for controlling the amplifier apparatus 21 as well as the entire recording/reproducing apparatus 1, and a communication interface section 13 for executing bidirectional communication with the amplifier apparatus 21.

In reproduction, the rule table creation section 6 functions as a learning section for learning the rule table, and the control section 12 functions as a DSP program parameter setting section for setting a DSP program parameter in the DSP of the amplifier apparatus 21.

The amplifier apparatus 21 includes an input selector 22 for selecting a desired sound input from among a plurality of sound sources, a DSP 23 for performing a sound field process or frequency characteristic process on sound data output from the input selector 22, a power amplifier 24 for amplifying an analog sound signal output from the DSP 23, and a communication interface section 25 for executing bidirectional communication with the recording/reproducing apparatus 1. The amplifier apparatus 21 also includes a storage section 26, and a control section 27 for controlling the entire amplifier apparatus 21. For example, a communication protocol to be used between the communication interface sections 13 and 25 of the recording/reproducing apparatus 1 and amplifier apparatus 21 may be an RS-232C protocol. Hereinafter, the sound field process and frequency characteristic process executed by the DSP 23 of the amplifier apparatus 21 will be generically referred to as an effect process.

Figure 2:
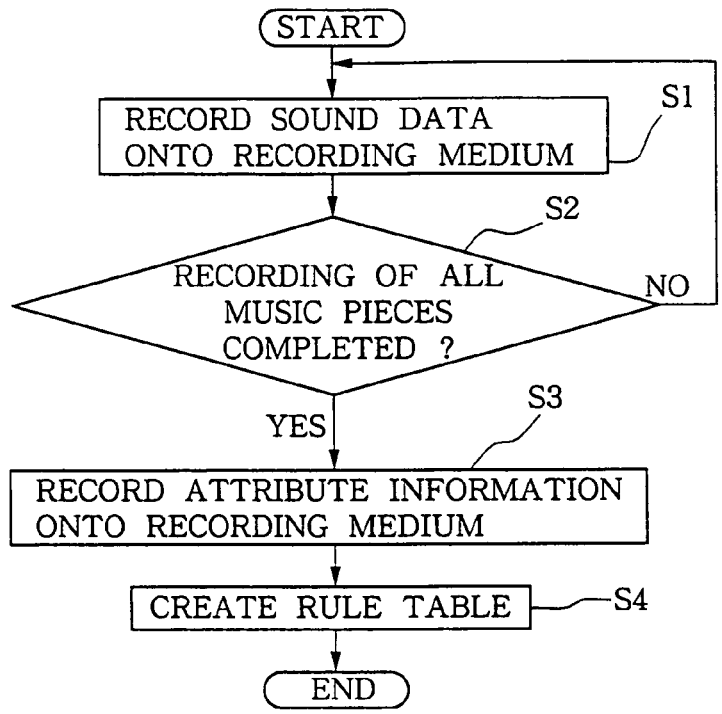
FIG. 2 is a flow chart of recording processing performed by a sound recording/reproducing apparatus shown in FIG. 1.

Now, a description will be given about recording processing performed by the sound recording/reproducing apparatus 1, with reference to FIG. 2 that is a flow chart showing an exemplary step sequence of the recording processing. First, the user inserts a CD in the CD drive device 2 and operates the input section 9 to request sound data recording from the inserted CD onto the recording medium 3. The control section 12 controls the sound data recording section 4 in accordance with the user's request so that the recording section 4 reads out the sound data from the inserted CD and records the read-out sound data onto the recording medium 3, at step S1 of FIG. 2. The operation at step S1 is carried out per user-designated music piece until the sound data recording, onto the recording medium 3, of every user-designated music piece (all or a portion, i.e. one or more but not all, of music pieces recorded on the CD) is completed, i.e. until an YES determination is made at step S2.

Next, the attribute information recording section 5 registers the attribute information of each of the music pieces in an attribute information database in association with the sound data of the music piece recorded at step S1, at step S3. The attribute information of the music piece includes music piece information, artist information, album information and genre information.

The music piece information contains data indicative of a music piece ID that is a unique number to identify the music piece and a name of the music piece. The album information contains an album ID that is a unique number to identify the album and a name of the album. The artist information contains an artist ID that is a unique number to identify the artist and a name of the artist. The genre information contains a genre ID that is a unique number to identify the genre and a name of the genre.

Figure 3:
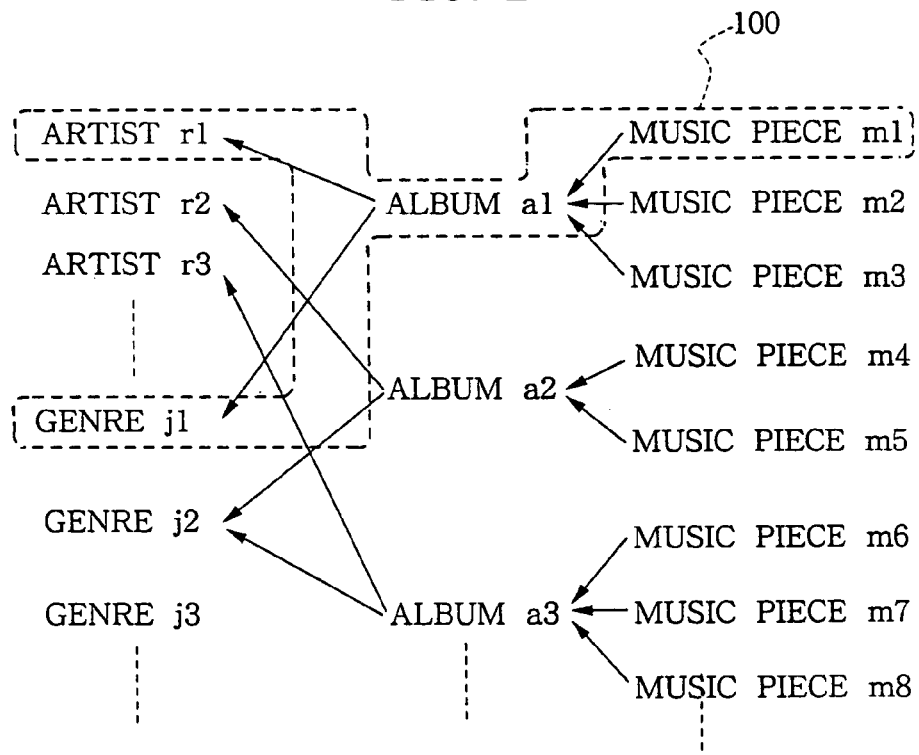
FIG. 3 is a diagram showing associated relationship among pieces of attribute information of music pieces to be managed in an attribute information database of the sound recording/reproducing apparatus of FIG. 1.

FIG. 3 is a diagram showing an example of correspondency or associated relationship among the various attribute information, including the music piece information, artist information, album information and genre information, registered in the attribute information database. The attribute information database is built in accordance with the following rules.

(A) The sound data sets of the individual music pieces and the music piece information of the music pieces correspond to each other on a one-to-one basis.

(B) One piece of music piece information corresponds to only one piece of album information; that is, one music piece belongs to only one album.

(C) One piece of album information corresponds to only one piece of artist information; that is, one album belongs to only one artist. As an exception, however, an omnibus album may belong to a plurality of artists.

(D) One piece of album information corresponds to only one piece of genre information; that is, one album belongs to only one musical genre.

For example, if a music piece of music piece ID "m1" belongs to an album of album ID "a1" and this album belongs to an artist of artist ID "r1" and musical genre of genre ID "j1", then data indicative of correspondency 100 is registered in the attribute information database. In this manner, correspondency among various attribute information is registered in the attribute information database.

The attribute information of any desired music piece, such as the respective names of the music piece and album and musical genre of the music piece, can be acquired by the control section 12 accessing a music CD information data server on the Internet, via the network interface section 11, when a CD containing sound data of the desired music piece has been inserted in the CD drive device 2. The control section 12 passes the attribute information, acquired from the music CD information data server, to the attribute information recording section 5.

The attribute information recording section 5 imparts a music piece ID, album ID and artist ID to the music piece, album and musical genre names given by the control section 12 and then registers the thus ID-imparted music piece, album and musical genre names in the attribute information database of the recording medium 3. In an alternative, the user may manipulate the input section 9 to enter attribute information of the desired music piece so that the attribute information recording section 5 can record the user-entered attribute information to the attribute information database.

Then, at step S4, the rule table creation section 6 creates, on the recording medium 3, a rule table storing data indicative of correspondency among the attribute information of music pieces, DSP program parameters each designating, to the DSP 23 of the amplifier apparatus 21 to be controlled, an effect process to be performed by the DSP 23, and model ID that is a unique number identifying the amplifier apparatus 21 to be controlled.

FIGS. 4A to 4D show examples of the rule table, which include four rule tables: a music piece rule table 101 associating (i.e., storing data indicative of correspondency among) music piece information (music piece IDs), DSP program parameters and model IDs; an album rule table 102 storing data indicative of correspondency among album information (album IDs), DSP program parameters and model IDs, an artist rule table 103 storing data indicative of correspondency among artist information (artist IDs), DSP program parameters and model IDs; and a genre rule table 104 storing data indicative of correspondency among genre information (genre IDs), DSP program parameters and model IDs. Details of the DSP program parameters illustrated in FIG. 4 will be explained later.

The user manipulates the input section 9 to select a desired music piece from the attribute information database and select an effect process, to be carried out during reproduction of the music piece, from among various effect processes executable by the amplifier apparatus 21 to be controlled. The rule table creation section 6 registers the music piece ID of the selected music piece and DSP program parameter of the selected effect process in the music piece rule table 101 in association with the model ID of the amplifier apparatus 21 to be controlled. How to acquire the model ID of the amplifier apparatus 21 to be controlled will be later described.

The user also manipulates the input section 9 to select a desired album from the attribute information database and select an effect process, to be carried out during reproduction of a music piece belonging to the album, from among various effect processes executable by the amplifier apparatus 21 to be controlled. The rule table creation section 6 registers the album ID of the selected album and DSP program parameter of the selected effect process in the album table 102 in association with the model ID of the amplifier apparatus 21 to be controlled.

The user also manipulates the input section 9 to select a desired artist from the attribute information database and select an effect process, to be carried out during reproduction of a music piece belonging to the artist, from among various effect processes executable by the amplifier apparatus 21 to be controlled. The rule table creation section 6 registers the artist ID of the selected artist and DSP program parameter of the selected effect process in the artist rule table 103 in association with the model ID of the amplifier apparatus 21 to be controlled.

Further, the user manipulates the input section 9 to select a desired musical genre from the attribute information database and select an effect process, to be carried out during reproduction of a music piece belonging to the musical genre, from among various effect processes executable by the amplifier apparatus 21 to be controlled. The rule table creation section 6 registers the genre ID of the selected artist and DSP program parameter of the selected effect process in the genre table 104 in association with the model ID of the amplifier apparatus 21 to be controlled.

The music piece rule table 101, album table 102, artist rule table 103 and genre table 104 are given priority in the order mentioned; that is, when any of the rule tables has to be looked up, reference is made to these tables 101, 102, 103 and 104 in descending order of the priority.

Note that it is not always necessary to register a DSP program parameter for each one of the music pieces, albums, artists and musical genres of the attribute information database; there may be one or more music pieces, albums, artists or musical genres for which no DSP program parameter is registered.

Further, because the music CD information data server can supply a limited number of known musical genre names, there may be created a default genre rule table 104 associating the known musical genres with DSP program parameters suitable for the musical genres, and such a default genre rule table 104 may be prerecorded on the recording medium 3, for example, at the time of shipment from the factory. Thus registering the default genre rule table 104 can lessen registration work to be done by the user.

Now, a description will be given about reproduction processing performed by the sound recording/reproducing apparatus 1, with reference to FIG. 5 that is a flow chart showing an exemplary step sequence of the reproduction processing. First, the user manipulates the input section 9 of the recording/reproducing apparatus 1 to select a music piece to be reproduced and request reproduction of the selected music piece, at step S11 of FIG. 5.

To select a music piece to be reproduced, the user may create a play list by designating every desired music piece, or designate an album, artist or musical genre. When the user has designated an album, artist or musical genre, the control section 12, by means of the reproduction section 7, refers to the attribute information of music pieces recorded on the recording medium 3, and then the control section 12 causes the name of every music piece corresponding to the designated album, artist or musical genre to be displayed on the display device 10. Then, the user selects all or a portion (i.e., one or more but not all) of the music pieces displayed on the display device 10.

Then, the control section 12 of the sound recording/reproducing apparatus 1 ascertains, at step S12, whether or not the input selector 22 of the amplifier apparatus 21 to be controlled is currently selecting the sound recording/reproducing apparatus 1 to which the control section belongs. Whether or not the input selector 22 of the amplifier apparatus 21 to be controlled is currently selecting the sound recording/reproducing apparatus 1 can be ascertained on the basis of a status acquired from the amplifier apparatus 21. FIG. 6A is a diagram showing a format of a control command given from the sound recording/reproducing apparatus 1, and FIG. 6B is a diagram showing a format of a message given from the amplifier apparatus 21 in response to a status acquisition command received from the recording/reproducing apparatus 1.

As shown in FIG. 6A, the control command given from the sound recording/reproducing apparatus 1 includes an STX (Start of Text) delimiter 201 of, for example, one byte indicative of the beginning of the control command, a command field 202 storing a value indicative of a type of the control command, an option field 203 storing an argument of the control command, and an ETX (End of Text) delimiter 204 of, for example, one byte indicative of the end of the control command.

For example, if the value of the command field 202 is "1", it means that the control command is a status acquisition command to acquire a status of the amplifier device 21. If the value of the command field 202 is "4", the control command is an effect ON/OFF command to turn on or off the effect process of the DSP 23 of the amplifier apparatus 21. Further, if the value of the command field 202 is "5", the control command is a DSP program parameter setting command to set a DSP program parameter in the DSP 23.

When the control command is the effect ON/OFF command to turn on the effect process of the DSP 23, a value "1" is stored in the option field 203. To turn off the effect process, a value "0" is stored in the option field 203.

Further, when the control command is the DSP program parameter setting command, a DSP program code, corresponding to a DSP program parameter to be set from the sound recording/reproducing apparatus 1 into the amplifier apparatus 2, is stored in the option field 203. On the recording medium 3 of the sound recording/reproducing apparatus 1, there is prestored a DSP program code table 105, as illustratively shown in FIG. 7, associating DSP program codes common to all possible models of amplifier apparatus 21 and DSP program codes specific to each individual model of amplifier apparatus 21.

On a recording medium 26 of the amplifier apparatus 21, on the other hand, there is prestored a DSP program code table 106, as illustratively shown in FIG. 8, associating DSP program codes and DSP program parameters of the apparatus. FIG. 8 shows an example of the DSP program code table 106 provided in the amplifier apparatus 21 of model ID "1".

Correspondency between the DSP program codes and the DSP program parameters is determined for each of the models of amplifier apparatus 21. For example, in the amplifier apparatus 21 of model ID "1", a DSP program code "0" corresponds to a DSP program parameter "HALL A". In the amplifier apparatus 21 of model ID "2", a DSP program code "1" corresponds to a DSP program parameter "CHURCH".

When the DSP program parameters "HALL A" and "HALL B" have been set, the DSP 23 of the amplifier apparatus 21 of model ID "1" performs sound filed processes to reproduce respective predetermined sound fields of concert halls. The DSP 23 of the amplifier apparatus 21 of model ID "2" performs similar operations when a DSP program parameter "HALL" has been set.

Further, when DSP program parameters "CHURCH A" and "CHURCH B" have been set, the DSP 23 of the amplifier apparatus 21 of model ID "1" performs sound filed processes to reproduce respective predetermined sound fields of churches. The DSP 23 of the amplifier apparatus 21 of model ID "2" performs similar operations when a DSP program parameter "CHURCH" has been set.

Further, when a DSP program parameter "JAZZ" has been set, the DSPs 23 of the amplifier apparatus 21 of model IDs "1" and "2" perform sound filed processes to reproduce sound fields of live music clubs. Further, when a DSP program parameter "ROCK" has been set, the DSP 23 of the amplifier apparatus 21 of model ID "1" performs a sound filed process to reproduce sound fields of a rock concert.

Furthermore, when a DSP program parameter "SCI-FI" has been set, the DSPs 23 of the amplifier apparatus 21 of model IDs "1" and "2" perform sound filed processes to reproduce sound fields suiting a motion picture making full use of special effects. Furthermore, when a DSP program parameter "ADVENTURE" has been set, the DSPs 23 of the amplifier apparatus 21 of model ID "1" and "2" perform sound filed processes to reproduce sound fields separately depicting words, music and effect sounds. Furthermore, when a DSP program parameter "GENERAL" has been set, the DSPs 23 of the amplifier apparatus 21 of model IDs "1" and "2" perform sound filed processes to reproduce sound fields suiting a motion picture of psychological description.

Message given from the amplifier apparatus 21 includes an STX delimiter 301 indicative of the beginning of the message, a model ID field 302 storing a model ID, an input selector field 303 storing an input code indicative of a current state of the input selector 22, an effect ON/OFF field 304 storing an effect status indicative of whether or not the DSP 23 is currently performing an effect process, a DSP program field 305 storing a DSP program code indicative of the effect process currently performed by the DSP 23, and an ETX delimiter 306 indicative of the end of the message.

On the recording medium 3 of the sound recording/reproduction apparatus 1, there is prestored an input code table 107, as shown in FIG. 9, which associates input codes common to all possible models of amplifier apparatus 21 and input terminals of the individual models. On the recording medium 26 of the amplifier apparatus 21, there is prestored an input code table 108, as shown in FIG. 10, which associates input codes and the input terminals of the apparatus 21. For example, the input code table 108 shown in FIG. 10 is one provided in the amplifier apparatus 21 of model ID "1".

Correspondency between the input codes and the input terminals of the amplifier apparatus 21 is determined for each of the models of amplifier apparatus 21. For example, in the amplifier apparatus 21 of model ID "1" and model ID "2", an input code "0" indicates that the input selector 22 is currently selecting a "CD" input terminal. In the amplifier apparatus 21 of model ID "1", an input code "6" indicates that the input selector 22 is currently selecting a "V-AUX" input terminal.

When the DSP 23 is currently performing an effect process, an effect status "1" is stored in the effect ON/OFF field 304. When the DSP 23 is not currently performing an effect process, an effect status "0" is stored in the effect ON/OFF field 304.

Details of the DSP program code stored in the DSP program field 305 have already been explained in relation to Table 1 above. For example, when the DSP 23 is currently performing the sound field process corresponding to the DSP program parameter "HALL A", the DSP program code "0" is stored in the DSP program field 305.

To ascertain the current status of the amplifier apparatus 21, the control section 12 of the sound recording/reproduction apparatus 1 transmits, via the communication interface section 13, a status acquisition command to the amplifier apparatus 21 on a periodical basis.

When such a status acquisition command has been received from the recording/reproduction apparatus 1 via the communication interface section 25, the control section 27 of the amplifier apparatus 21 returns, to the sound recording/reproduction apparatus 1 via the communication interface section 25, a message that includes: the model ID of the amplifier apparatus 21 which it belongs to; an input code indicative of the current state of the input selector 22; an effect status corresponding to a current operating state of the DSP 23; and a DSP program code indicative of the currently-performed effect process.

The control section 27 of the amplifier apparatus 21 determines an input code corresponding to the input terminal selected by the input selector 22 on the basis of the input code table 108 stored in the storage section 26, and it determines a DSP program code corresponding to the DSP program parameter set in the DSP 23 on the basis of the DSP program table 106 stored in the storage section 26.

The control section 12 of the sound recording/reproduction apparatus 1 acquires the model ID from the model ID field 302 of the message received from the amplifier apparatus 21 via the communication interface section 13. In this way, the control section 12 can acquire the model ID of the amplifier apparatus 21 to be controlled currently connected to the sound recording/reproduction apparatus 1.

Figure 5:
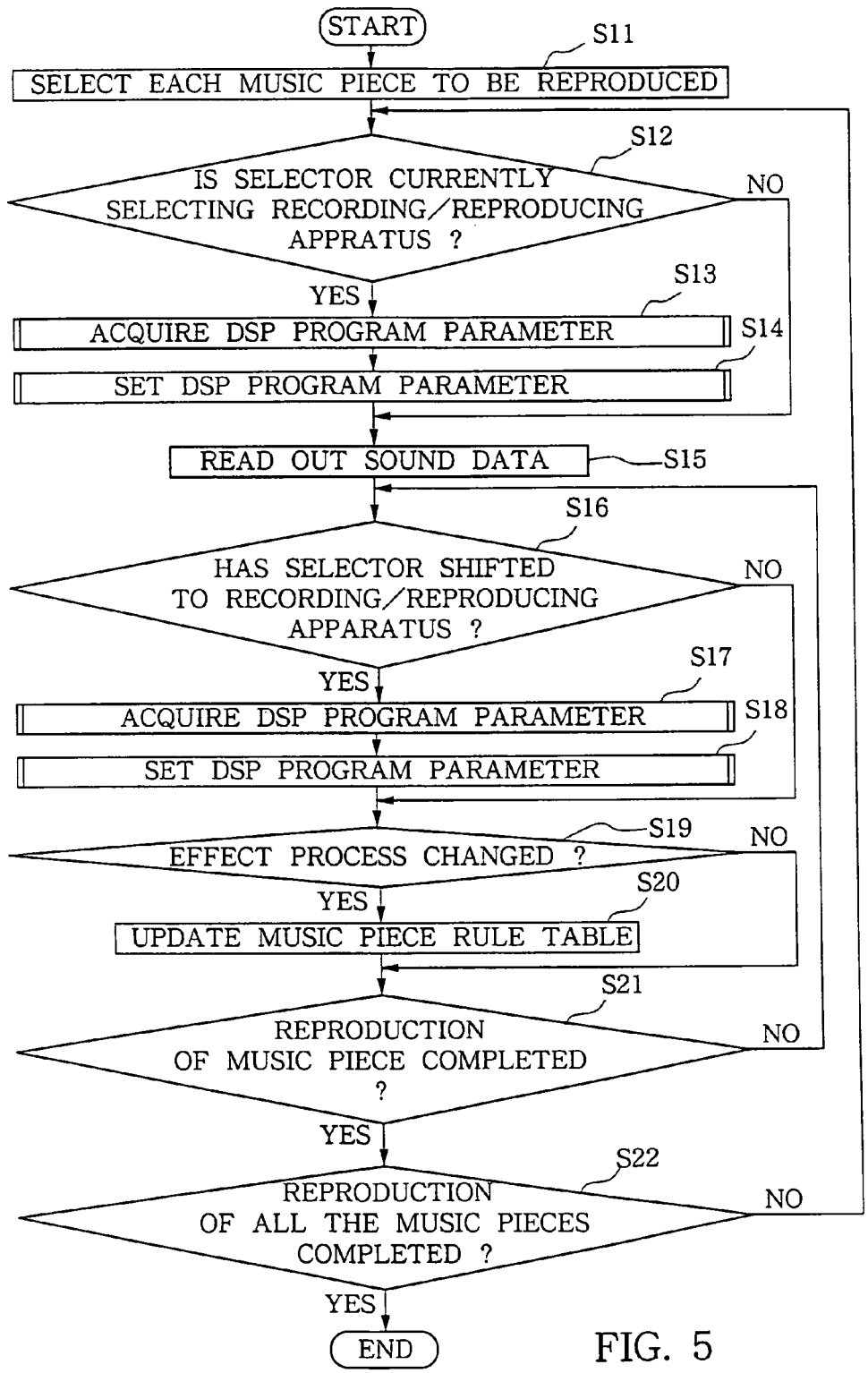
FIG. 5 is a flow chart of reproduction processing performed by the sound recording/reproducing apparatus of FIG. 1.

Then, the control section 12 acquires the input code from the input selector field 303 of the received message and ascertains whether or not the input selector 22 of the amplifier apparatus 21 is currently selecting the sound recording/reproduction apparatus 1 which the control section 12 belongs to (step S12 of FIG. 5).

In the illustrated examples of FIGS. 9 and 10, there is stored no input code corresponding to the sound recording/reproduction apparatus 1. However, if a sound output of the sound recording/reproduction apparatus 1 is coupled to a "V-AUX" input terminal of the amplifier apparatus 21, it will suffice for the user to register, as an input terminal for the recording/reproduction apparatus 1, "V-AUX" in the control section 12 of the recording/reproduction apparatus 1.

Thus, when the model ID and input code have been acquired from the received message, and if the input terminal corresponding to the model ID and input code is "V-AUX" on the input code table 107, the control section 12 of the recording/reproduction apparatus 1 determines that the input selector 22 of the amplifier apparatus 21 is currently selecting that recording/reproduction apparatus 1; however, if the input terminal corresponding to the model ID and input code is not "V-AUX", the control section 12 determines that the input selector 22 is not currently selecting that recording/reproduction apparatus 1.

Figure 11:
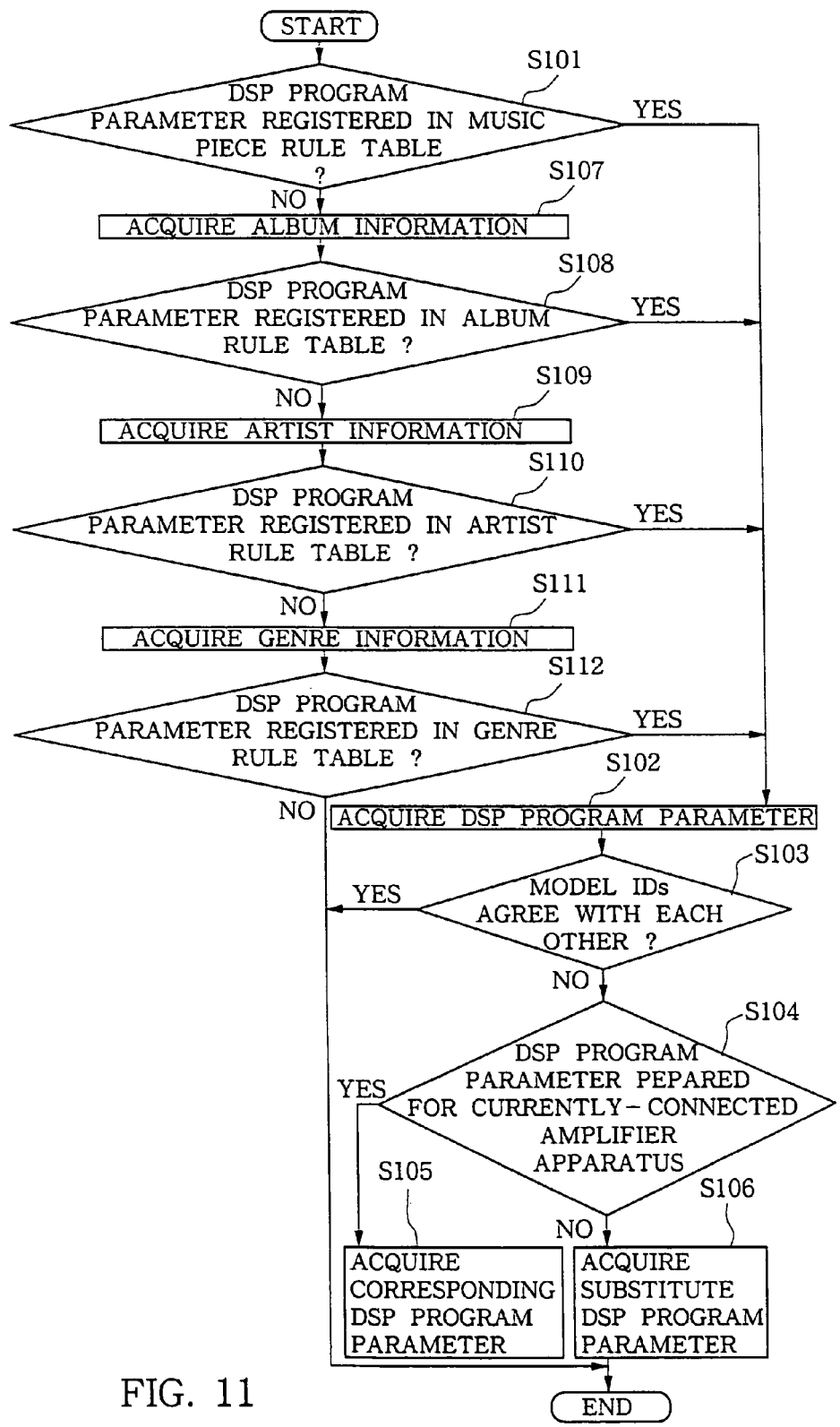
FIG. 11 is a flow chart showing details of a DSP program parameter acquisition process performed in the first embodiment.

If the input selector 22 is currently selecting the recording/reproduction apparatus 1 as determined at step S12, the control section 12 instructs the DSP program parameter acquisition section 8 to acquire a DSP program parameter corresponding to the attribute information of the music piece to be reproduced (in the following description, music piece of music piece ID "m") (step S13). FIG. 11 is a flow chart showing details of a DSP program parameter acquisition process performed in the sound recording/reproduction apparatus 1.

In the sound recording/reproduction apparatus 1, the DSP program parameter acquisition section 8 refers to the rule tables of the recording medium 3. Specifically, the section 8 refers to the music piece rule table 101, album rule table 102, artist rule table 103 and genre rule table 104 in the descending order of the above-mentioned priority.

Namely, the DSP program parameter acquisition section 8 first refers to the music piece rule table 101 of the highest priority to ascertain whether any DSP program parameter corresponding to the music piece of music piece ID "m" is already registered in the music piece rule table 101, at step S101 of FIG. 11. If such a DSP program parameter corresponding to the music piece of music piece ID "m" is already registered in the music piece rule table 101, the acquisition section 8 acquires the registered DSP program parameter, at step S102.

Then, at step 103, the DSP program parameter acquisition section 8 acquires, from the music piece rule table 101, a model ID corresponding to the acquired DSP program parameter, and compares this model ID and the model ID acquired from the message given from the amplifier apparatus 21 currently connected to the sound recording/reproduction apparatus 1.

If the model ID acquired from the music piece rule table 101 and the model ID acquired from the message agree with each other, i.e. if the amplifier apparatus 21 connected to the recording/reproduction apparatus 1 when the DSP program parameter was registered in the music piece rule table 101 and the currently-connected amplifier apparatus 21 coincides with each other, (YES determination at step S103), the DSP program parameter acquisition section 8 judges that the acquisition of the necessary DSP program parameter has been completed, and then the DSP program parameter acquisition process is brought to an end.

If, on the other hand, the model ID acquired from the music piece rule table 101 and the model ID acquired from the message do not agree with each other, the DSP program parameter acquisition section 8 refers to a DSP program associating table 109 as illustratively shown in FIG. 12. The DSP program associating table 109 is a table that associates major classes of DSP program parameters, each comprehending DSP program parameters of a same type, and DSP program parameters of the individual models of amplifier apparatus 21.

By referring to the DSP program associating table 109, the DSP program parameter acquisition section 8 determines, at step S104, whether there is prepared in advance, for the currently-connected amplifier apparatus 21, a DSP program parameter corresponding, on a one-to-one basis, to the model ID and DSP program parameter acquired from the music piece rule table 101. If such a DSP program parameter is prepared in advance as determined at step S104, the acquisition section 8, at step S105, acquires the prepared DSP program parameter as a substitute for the DSP program parameter acquired at step S102, after which the DSP program parameter acquisition process is brought to an end.

For example, if the model ID and DSP program parameter acquired from the music piece rule table 101 is "2" and "HALL", respectively, and if the model ID of the currently-connected amplifier apparatus 21 is "1", the two model IDs do not agree with each other. Thus, in this case, the DSP program parameter acquisition section 8 acquires the DSP program parameter "HALL A" of model ID "1", as a DSP program parameter corresponding to the DSP program parameter "HALL" of model ID "2" on a one-to-one basis.

If there is no DSP program parameter corresponding, on a one-to-one basis, to the model ID and DSP program parameter acquired from the music piece rule table 101, the DSP program parameter acquisition section 8, at step S106, acquires, from among the DSP program parameters registered in the table 109 for the currently-connected amplifier apparatus 21, a DSP program parameter belonging to the same major class as the DSP program parameter acquired from the music piece rule table 101, as a substitute for the DSP program parameter acquired at step S102, after which the DSP program parameter acquisition process is brought to an end.

For example, if the model ID and DSP program parameter acquired from the music piece rule table 101 is "2" and "CHURCH", respectively, then the amplifier apparatus 21 of model ID "1" has no DSP program parameter corresponding to "CHURCH" on a one-to-one basis. Thus, the DSP program parameter acquisition section 8 acquires, as a substitute DSP program parameter, the DSP program parameter "CHURCH A" belonging to the same major class "CHURCH" as the DSP program parameter "CHURCH", from among DSP program parameters prepared in advance for the amplifier apparatus 21 of model ID "1".

In case a plurality of DSP program parameters, such as "CHURCH A" and "CHURCH B", belong to the same major class, the DSP program parameter acquisition section 8 acquires a representative one of such DSP program parameters; normally, the first or leading one of the DSP program parameters in the major class is selected as the representative DSP program parameter.

If no DSP program parameter corresponding to the music piece of music piece ID "m" is registered in the music piece rule table 101, the acquisition section 8, at step S107, refers to the attribute information database of the recording medium 3 and thereby acquires album information (in the following description, album information of album ID "a") corresponding to the music piece of music piece ID "m".

Then, the DSP program parameter acquisition section 8 refers to the album rule table 102 of the second-highest priority to ascertain whether any DSP program parameter corresponding to the album information of album ID "a" is already registered in the table 102, at step S108 of FIG. 11. If such a DSP program parameter corresponding to the album information is registered in the table 102, the acquisition section 8 acquires the registered DSP program parameter at step S102. After that, the above-described operation of step S103 is carried out.

If no DSP program parameter corresponding to the album information of album ID "a" is registered in the album rule table 102 as determined at step S108, the DSP program parameter acquisition section 8, at step S109, refers to the attribute information database of the recording medium 3 and thereby acquires artist information (in the following description, artist information of artist ID "r") corresponding to the album information of album piece ID "a".

Then, the DSP program parameter acquisition section 8 refers to the artist rule table 103 of the third-highest priority to ascertain whether any DSP program parameter corresponding to the artist information of artist ID "r" is already registered in the table 103, at step S110 of FIG. 11. If such a DSP program parameter corresponding to the artist information is registered in the table 103, the acquisition section 8 acquires the registered DSP program parameter at step S102. After that, the above-described operation of step S103 is carried out.

If no DSP program parameter corresponding to the artist information of artist ID "r" is registered in the artist rule table 103 as determined at step S110, the DSP program parameter acquisition section 8, at step S111, refers to the attribute information database of the recording medium 3 and thereby acquires genre information (in the following description, genre information of artist ID "j") corresponding to the album information of album piece ID "a".

Then, the DSP program parameter acquisition section 8 refers to the genre rule table 104 of the lowest priority to ascertain whether any DSP program parameter corresponding to the genre information of genre ID "j" is already registered in the table 104, at step S112 of FIG. 11. If such a DSP program parameter corresponding to the genre information is registered in the table 104, the acquisition section 8 acquires the registered DSP program parameter at step S102. After that, the above-described operation of step S103 is carried out.

If no DSP program parameter corresponding to the genre information of genre ID "j" is registered in the genre rule table 104 as determined at step S112, the DSP program parameter acquisition section 8 judges that there is no DSP program parameter corresponding to the attribute information of the music piece to be reproduced, and thus the DSP program parameter acquisition process is brought to an end.

Figures 13, 14:
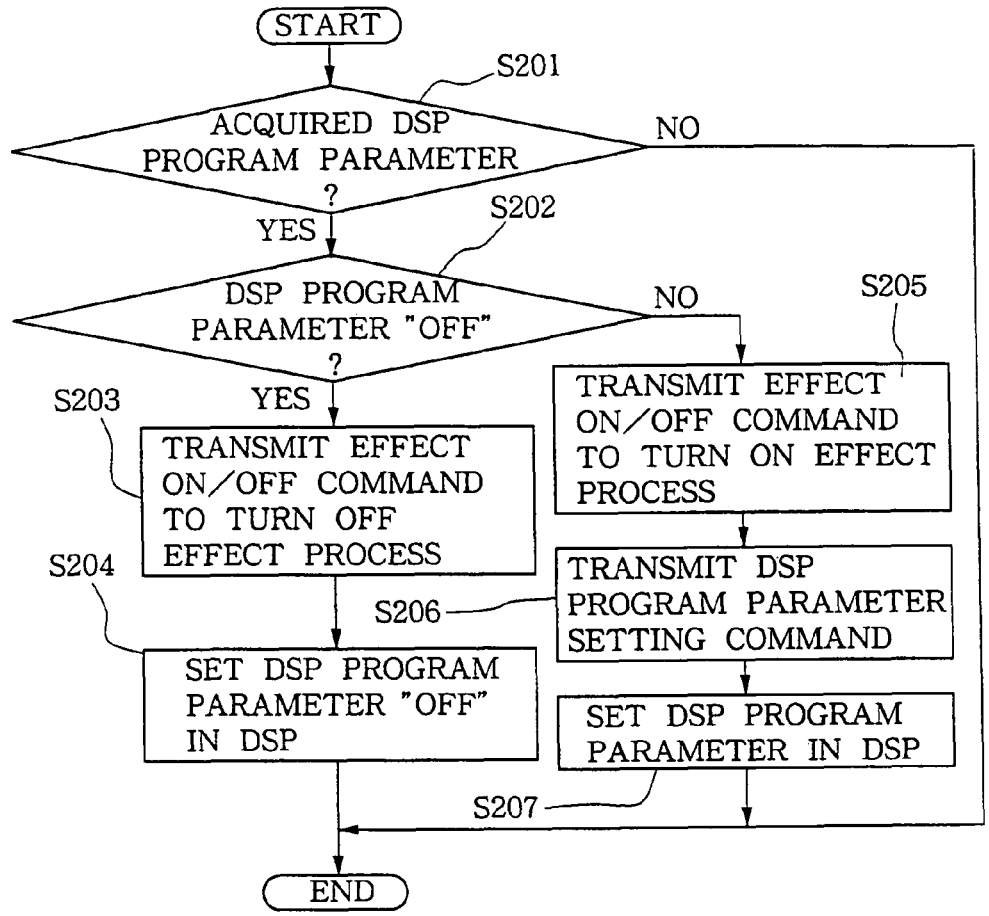
FIG. 13 is a flow chart showing details of a DSP program parameter setting process performed in the first embodiment.
FIG. 14 is a diagram showing another example of a format of a music piece rule table constituting a second embodiment of the present invention.

After termination of the DSP program parameter acquisition process, the control section 12 of the sound recording/reproduction apparatus 1 sets the DSP program parameter for the amplifier apparatus 21 (step S14 of FIG. 5). FIG. 13 is a flow chart showing details of a DSP program parameter setting process performed by the control section 12.

First, the control section 12 determines whether or not any DSP program parameter has been acquired by the DSP program parameter acquisition section 8, at step S201 of FIG. 13. If any DSP program parameter has been acquired at step S102 or at any one of steps S105 and S106, a YES determination is made at step S201.

If any DSP program parameter has been acquired as determined at step S201, the control section 12 further determines, at step S202, whether the DSP program parameter received from the DSP program parameter acquisition section 8 is "OFF". If answered in the affirmative at step S202, the control section 12 transmits, to the amplifier apparatus 21 via the communication interface section 13, an effect ON/OFF command having the value "0" stored in the option field 203, in order to turn off the effect process of the amplifier apparatus 21 (step S203).

The control section 27 of the amplifier apparatus 21, having received the effect ON/OFF command via the communication interface section 25, sets, at step S204, the DSP program parameter "OFF" in the DSP 23 of the amplifier apparatus 21 if the option filed 203 of the effect ON/OFF command is "0".

If, on the other hand, the DSP program parameter received from the DSP program parameter acquisition section 8 is not "OFF", the control section 12 transmits, to the amplifier apparatus 21, an effect ON/OFF command having the value "1" stored in the option field 203, in order to turn on the effect process of the amplifier apparatus 21 (step S205).

The control section 12 acquires, from the DSP program code table 105 of the recording medium 3, a DSP program code corresponding to both the model ID of the amplifier apparatus 21 currently connected to the sound recording/reproduction apparatus 1 and the acquired DSP program parameter, stores the thus-acquired DSP program code in the option field 203 of the DSP program parameter setting command, and then transmits the DSP program parameter setting command to the amplifier apparatus 21 (step S206).

The control section 27 of the amplifier apparatus 21, having received the DSP program parameter setting command via the communication interface section 25, acquires the DSP program code from the option field 203 of the parameter setting command, then acquires, from the DSP program table 106 of the storage section 26, a DSP program parameter corresponding to the DSP program code, and sets the thus-acquired DSP program parameter in the DSP 23 (step S207). After that, the DSP program parameter setting process is brought to an end.

Needless to say, if no DSP program parameter has been acquired (NO determination at step S201), the DSP program parameter setting process is brought to an end without setting any DSP program parameter.

Then, the control section 12 instructs the reproduction section 7 to reproduce the music piece of music piece ID "m", so that the reproduction section 7 reads out, from the recording medium 3, the sound data corresponding to the music piece ID "m" in accordance with the instruction from the control section 12 (step S15 of FIG. 5).

Each of the sound data output from the sound recording/reproducing apparatus 1 is input to the DSP 23 via the input selector 22. The DSP 23 performs the effect process on the input sound data in accordance with the set DSP program parameter and then converts the effect-processed sound data into an analog signal. The analog sound signal output from the DSP 23 is amplified by the power amplifier 24 and passed to the speaker 31.

Note that when the input selector 22 is not currently selecting the sound recording/reproducing apparatus 1 (NO determination at step S12), the control section 12 does not perform the DSP program parameter acquisition process of step S13 and DSP program parameter setting process of step S14. However, execution of the reproduction processing of step S15 is continued unless the user gives a particular instruction for discontinuing the reproduction.

When the input selector 22 of the amplifier apparatus 21 is not selecting the sound recording/reproducing apparatus 1, the user is allowed to operate the input selector 22 of the amplifier apparatus 21 to select the sound recording/reproducing apparatus 1 during the reproduction of the music piece. As described above, the control section 12 of the sound recording/reproducing apparatus 1 periodically transmits the status acquisition command to the amplifier apparatus 21 and receives a message sent back from the amplifier apparatus 21 in response to the status acquisition command. As the user operates the input selector 22 during the music piece reproduction, the input code in the message sent periodically from the amplifier apparatus 21 is caused to change.

Once a change takes place in the input code of the message received from the amplifier apparatus 21, the control section 12 acquires, from the input code table 107, a particular type of input terminal corresponding to the model ID and input code obtained from the message.

If the acquired input terminal type corresponds to the sound recording/reproducing apparatus 1, the control section 12 judges that the input selector 22 has shifted its selection to the recording/reproducing apparatus 1 from another sound generator (i.e., YES determination at step S16), so that it performs the same DSP program parameter acquisition process as step S13 at step S17 and the same DSP program parameter setting process as step S14 at step S18.

Further, the user is allowed to manually change the effect process of the amplifier apparatus 21 during the music piece reproduction. As the user changes the effect process of the amplifier apparatus 21 during the music piece reproduction, the input code included in the message sent periodically from the amplifier apparatus 21 is caused to change.

Once a change takes place in the input code of the message received from the amplifier apparatus 21 during the music piece reproduction, the control section 12 judges that a change has been made to the effect process of the amplifier apparatus 21 (YES determination at step S19), and it acquires, from the DSP program code table 105, a particular DSP program parameter corresponding to the model ID and DSP program code obtained from the received message.

Then, the control section 12 delivers, to the rule table creation section 6, the music piece ID "m" of the currently-reproduced music piece, DSP program parameter acquired on the basis of the received message from the amplifier apparatus 21 and model ID acquired from the received message. The rule table creation section 6 registers the music piece ID, DSP program parameter and model ID in the music piece rule table 101 in association with one another, at step S20. If the DSP program parameter and model ID corresponding to the music piece ID "m" is already registered in the music piece rule table 101, then these information is updated. In this way, automatic learning of the music piece rule table 101 is permitted in response to operation by the user.

The operations of steps S16-S21 are repeated until the reproduction of the music piece of music piece ID "m" is completed (YES determination at step S21). After completion of the reproduction of the music piece, the control section 12 further determines, at step S22, whether or not all the music pieces to be reproduced have been reproduced. If answered in the negative at step S22, the control section 12 reverts to step S12 to reproduce the next music piece to be reproduced. This way, the operations of steps S12-S22 are performed for each of the music pieces to be reproduced.

In the above-described manner, the instant embodiment can control the effect process to be performed by the DSP 23 of the amplifier apparatus 21, in accordance with the attribute information of the music piece, so that it can eliminate a need for the user to change the settings of the DSP 23 per music piece.

Second Embodiment

FIG. 14 shows a format of a music piece rule table 101a constituting a second embodiment of the present invention. Whereas one DSP program parameter is registered for each music piece (music piece ID) in the above-described first embodiment, a plurality of DSP program parameters may be registered for each music piece ID.

The music piece rule table 101*a* in the second embodiment is characterized by storing data indicating correspondency among music piece IDs, processing start times of the sound field process or frequency characteristic process to be performed by the DSP 23 and model IDs. The general setup of the recording/reproducing system in this embodiment is substantially the same as that in the first embodiment and will be described using the same reference characters as in FIG. 1.

In the second embodiment, recording processing performed by the sound recording/reproducing apparatus 1 is substantially similar to that in the first embodiment, but different therefrom in the behavior of the rule table creation section 6 when creating the music piece rule table 101*a* on the recording medium 3.

The user manipulates the input section 9 of the sound recording/reproducing apparatus 1 to select a desired music piece from the attribute information database, select a desired one of effect processes executable by the amplifier apparatus 21 to be controlled and then designate a desired processing start time (time from the beginning of the music piece) when the selected effect process should be initiated.

The rule table creation section 6 registers the music piece ID of the selected music piece, designated processing start time and DSP program parameter of the selected effect process in the music piece rule table 101*a* in association with the model ID of the amplifier apparatus 21 to be controlled (step S4 of FIG. 2) In the music piece rule table 101*a* initially created by the rule table creation section 6, there may be registered a music piece with no DSP program parameter registered therefor, or there may be registered only a DSP program parameter with a processing start time of "0" minute "00" second ("0:00").

Figure 15:
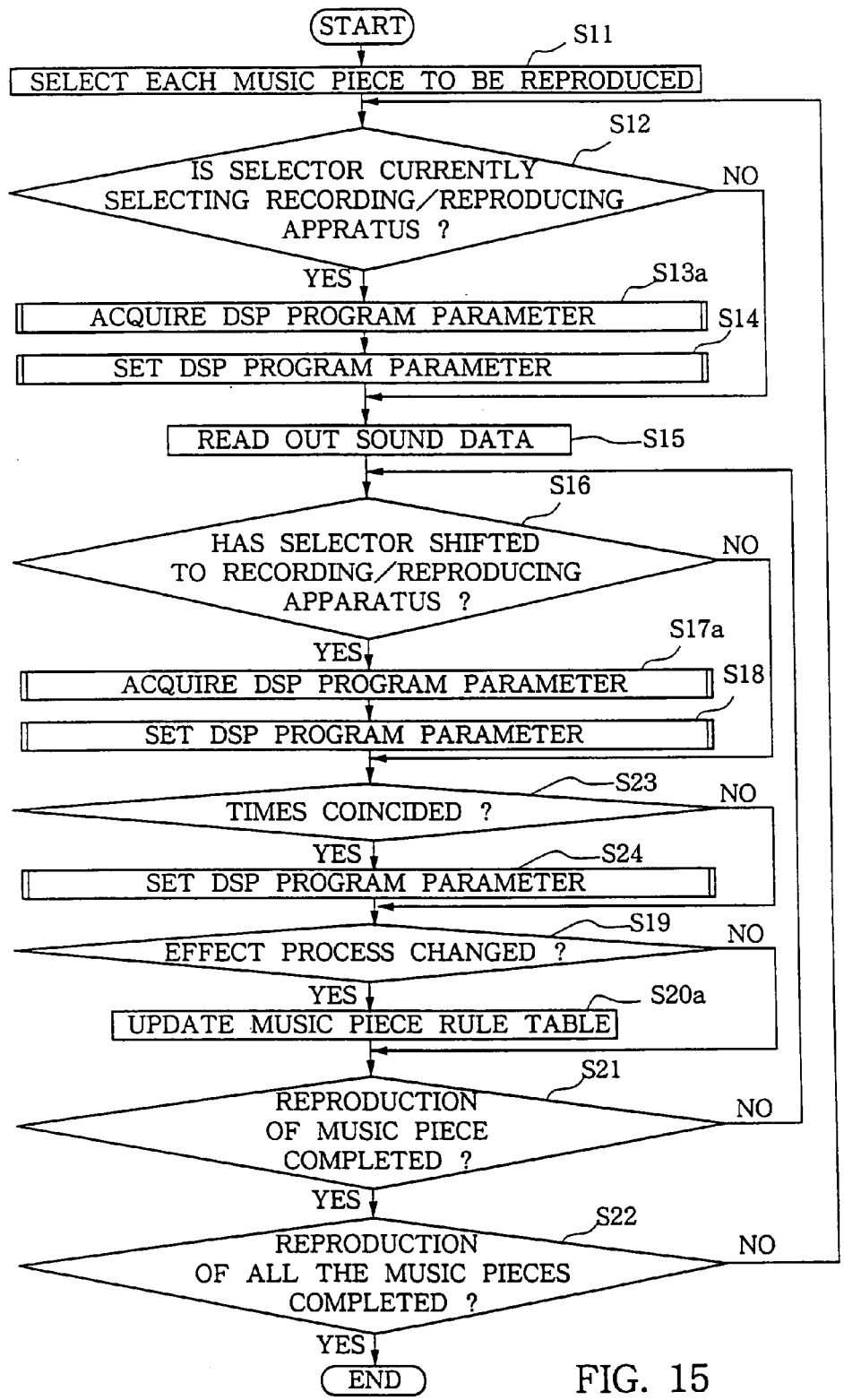
FIG. 15 is a flow chart of reproduction processing performed by the sound recording/reproducing apparatus in the second embodiment.

FIG. 15 is a flow chart of reproduction processing performed by the sound recording/reproducing apparatus 1 in the second embodiment, where the same operations are denoted by the same reference characters (step numbers) as in FIG. 5. Operations of steps 11 and S12 are the same as steps 11 and S12 in the first embodiment. DSP program parameter acquisition process of step S13*a* is substantially similar to the process of step S13 in the first embodiment, but different therefrom in that, if any DSP program parameter corresponding to the music piece to be reproduced is already registered in the music piece rule table 101*a* of the recording medium 3 (YES determination at step S101 of FIG. 11), step S102 acquires, from the music piece rule table 101*a*, a DSP program parameter of processing start time "0:00".

Steps S14-S16 and S18 of FIG. 15 are the same as steps S14-S16 and S18 in the first embodiment, and step S17*a* of FIG. 15 is the same as step S13*a* of the figure. Then, if any DSP program parameter corresponding to the currently-reproduced music piece (music piece ID) and corresponding to a processing start time greater than the time "0:00" is already registered in the music piece rule table 101*a*, and when an elapsed reproducing time of the music piece has coincided with the processing start time registered in the music piece rule table 101*a* (YES determination at step S23), the DSP program parameter acquisition section 8 acquires, from the music piece rule table 101*a*, the DSP program parameter corresponding to that time and passes the acquired DSP program parameter to the control section 12. Thus, the control section 12 executes the DSP program parameter setting process at step S24; step S24 is directed to the same operation as step S14.

Specifically, as regards the illustrated example of FIG. 14, once reproduction of the music piece of music piece ID "1" is initiated, the DSP program parameter "SCI-FI" corresponding to the processing start time "0:00" is set into the amplifier apparatus 21. Then, once the elapsed reproducing time reaches two minutes and thirty seconds (2:30), the DSP program parameter is set to "OFF". Further, once the elapsed reproducing time reaches four minutes and ten seconds (4:10), the DSP program parameter "GENERAL" is set. In this way, the music-piece can be reproduced with the effect process caused to change in accordance with a change in the elapsed reproducing time.

If a change has been made to the effect process in the amplifier apparatus 21 during the reproduction of the music piece (YES determination at step S19), the control section 12 of the sound recording/reproducing apparatus 1 determines, as the processing start time, the elapsed reproducing time from the reproduction start time of the music piece to the current time, and it delivers, to the rule table creation section 6, the music piece ID of the currently-reproduced music piece, determined processing start time, DSP program parameter acquired on the basis of a received message from the amplifier apparatus 21 and model ID acquired from the message.

The rule table creation section 6 registers the music piece ID, processing start time, DSP program parameter and model ID, received from the control section 12, in the music piece rule table 101*a* in association with one another (step S20*a*). Operations of steps S21 and S22 are the same as steps S21 and S22 in the first embodiment.

In the above-described manner, the embodiment permits automatic learning by which the elapsed reproducing time when the user has changed the effect process and the changed DSP program parameter are registered in the music piece rule table 101*a*.

Third Embodiment

Figure 16:
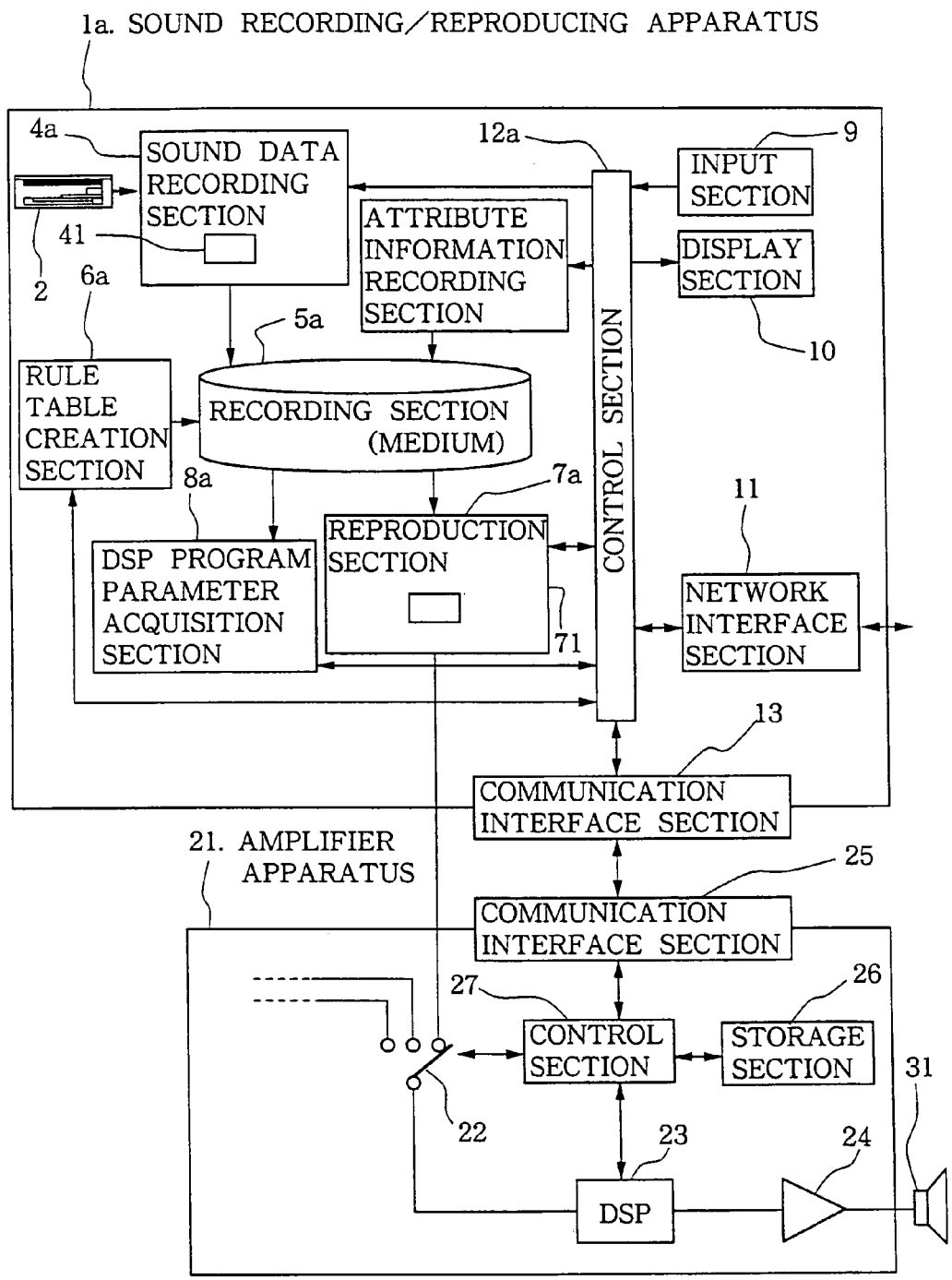
FIG. 16 is a block diagram showing a general setup of a sound recording/reproducing system in accordance with a third embodiment of the present invention.

FIG. 16 is a block diagram showing a general setup of a sound recording/reproducing system in accordance with a third embodiment of the present invention, where the same elements as in FIG. 1 are represented by the same reference numerals. Sound recording/reproducing apparatus 1*a* in the instant embodiment includes: a CD drive device 2; a recording medium 3, a sound data recording section 4*a* for recording sound data onto the recording medium 3 after compressing the sound data; an attribute information recording section 5*a* for recording compression scheme information onto the recording medium 3 as attribute information of a music piece; a reproduction section 7*a* for reading out the compressed sound data from the recording medium 3 and outputting the read-out sound data in depressed form; a DSP program parameter acquisition section 8*a* for acquiring the attribute information, including the compression scheme information, of a music piece to be reproduced, and acquiring from a rule table, a DSP program parameter corresponding to the acquired attribute information; an input section 9; a display section 10; a network interface section 11; a control section 12*a*; and a communication interface section 13.

Recording processing performed by the sound recording/reproducing apparatus 1*a* in the third embodiment is generally the same as that performed by the sound recording/reproducing apparatus 1 in the first embodiment and thus will be described with reference to FIG. 2. The user inserts a CD in the CD drive device 2 and operates the input section 9 to request sound data recording from the CD onto the recording medium 3 after the sound data are compressed in accordance with a desired compression scheme. The control section 12*a* controls the sound data recording section 4*a* in accordance with the user's request. The sound data recording section 4*a* includes a built-in encoder 41 and passes the non-compressed sound data, read out from the CD, to the encoder 41. The encoder 41 compresses the sound data in accordance with a compression scheme designated by the user. Then, the sound data recording section 4a records the sound data, compressed by the encoder 41, onto the recording medium 3, at step S1 of FIG. 2.

Next, the attribute information recording section 5a registers the attribute information of the music piece in the attribute information database of the recording medium 3 in association with the sound data of the music piece recorded at step S1, at step S3. In this case, the attribute information of the music piece includes the compression scheme information, indicative of a format and bit rate, of the music piece, and genre information. The genre information can be acquired from a music CD information data server on the Internet as previously noted in relation to the first embodiment.

Figures 17, 18:
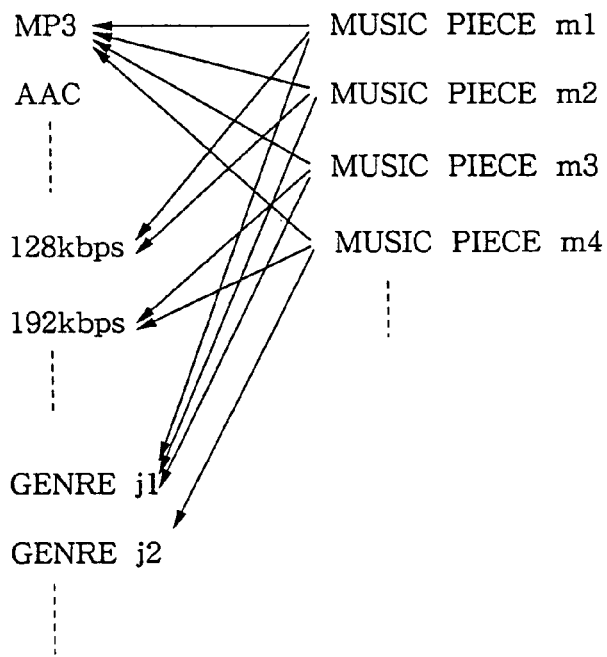
FIG. 17 is a diagram showing associated relationship among pieces of attribute information of music pieces to be managed in an attribute information database of the sound recording/reproducing apparatus of FIG. 16.
FIG. 18 is a diagram showing an example of a rule table provided in the sound recording/reproducing apparatus of FIG. 16.

FIG. 17 is a diagram showing an example of correspondency between pieces of the compression scheme information and genre information registered in the attribute information database. The attribute information database is built in accordance with the following rules.

(E) One music piece corresponds to only one piece of the compression scheme information; that is, one music piece is compressed using a given format and a given bit rate.

(F) One music piece corresponds to only one piece of the genre information; that is, one music piece one belongs to one musical genre.

In the illustrated example of FIG. 17, a music piece of music piece ID "m1" is compressed by a compression scheme employing a "MP3" format and a 128-kbps bit rate, and belongs to a musical genre of genre ID "j1". In this way, correspondency of various pieces of the attribute information is registered in the attribute information database.

Then, at step S4, the rule table creation section 6a creates, on the recording medium 3, a rule table storing data indicative of correspondency among the attribute information of music pieces, DSP program parameters each designating, to the DSP 23 of the amplifier apparatus 21 to be controlled, an effect process to be performed, and model ID that is a unique number identifying the amplifier apparatus 21 to be controlled.

FIG. 18 shows an example of the rule table. The rule table 110 in the instant embodiment stores data indicative of correspondency among music piece IDs, compression scheme information each indicative of a compression format and bit rate, genre information (genre IDs), DSP program parameters and model IDs. In the example of FIG. 18, "EQUALIZE A" and "EQUALIZE B" are DSP program parameters that cause the DSP 23 of the amplifier apparatus 21 to perform a frequency characteristic process for correcting medium- and high-frequency components.

The user manipulates the input section 9 to select a desired music piece from the attribute information database and select an effect process, to be carried out during reproduction of the music piece, from among various effect processes executable by the amplifier apparatus 21 to be controlled. The rule table creation section 6a acquires, from the attribute information database, compression scheme information and genre information corresponding to the selected music piece (music piece ID), and it registers the music piece ID of the selected music piece and DSP program parameter of the selected effect process in the rule table 110 in association with the model ID of the amplifier apparatus 21 to be controlled.

Compression schemes executable by the encoder 41 of the sound data recording section 4a are conventionally known, and musical genre names supplied by the music CD information data server are also conventionally known. Therefore, any combinations of the compression scheme information and genre information are also conventionally known. There may be created a default genre rule table that associates combinations of the known compression schemes and musical genre names with DSP program parameters suitable for the combinations, and such a default rule table may be prerecorded on the recording medium 3, for example, at the time of shipment from the factory.

In such a case, the rule table creation section 6a acquires, from the default rule table, a DSP program parameter corresponding to the compression schemes information and genre information acquired form the attribute information database, and it creates the rule table 110 by associating the DSP program parameter, music piece ID and model ID. Thus registering the default rule table can significantly reduce loads on the user.

Figure 19:
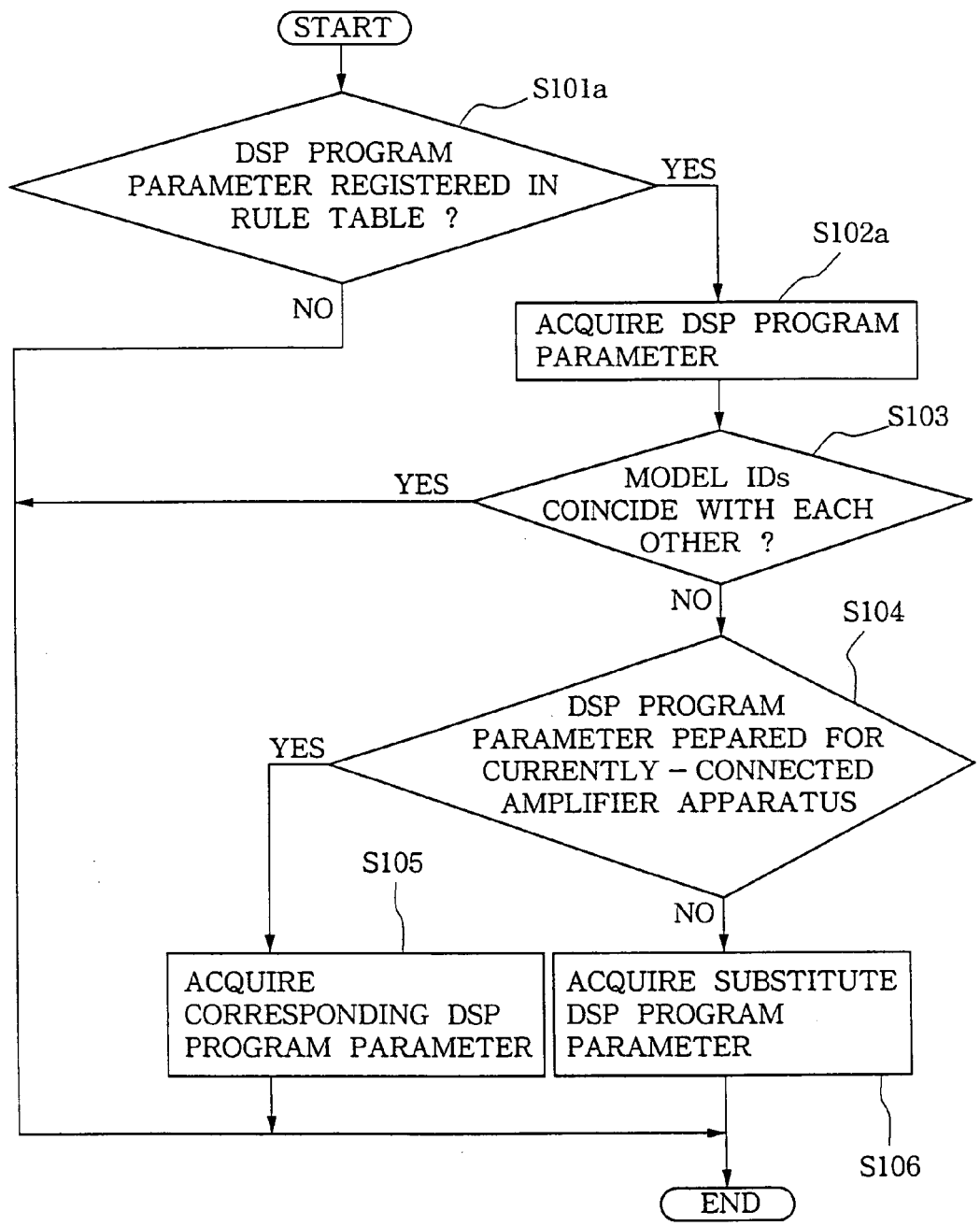
FIG. 19 is a flow chart showing details of a DSP program parameter acquisition process performed in the third embodiment.

Reproduction processing performed by the sound recording/reproducing apparatus 1a is generally the same as that performed by the sound recording/reproducing apparatus 1 in the first embodiment and thus will be described with reference to FIG. 5. Operations at steps S11 and S12 in the instant embodiment are the same as the operations of steps S11 and S12 in the first embodiment. If the input selector 22 of the amplifier apparatus 21 is currently selecting the sound recording/reproduction apparatus 1a as determined at step S12, the control section 12 of the recording/reproduction apparatus 1a instructs the DSP program parameter acquisition section 8a to acquire a DSP program parameter corresponding to the attribute information of the music piece to be reproduced, at step S13. FIG. 19 is a flow chart showing details of a DSP program parameter acquisition process performed in the sound recording/reproduction apparatus 1a, where the same operations as in FIG. 11 are denoted by the same step numbers.

In the DSP program parameter acquisition process, the DSP program parameter acquisition section 8a acquires, from the attribute information database, compression scheme information and genre information (genre ID) corresponding to the music piece to be reproduced (i.e., music piece ID of the music piece). Then, the DSP program parameter acquisition section 8a refers to the rule table 110 of the storage medium 3 to ascertain whether any DSP program parameter corresponding to the music piece ID of the music piece to be reproduced and acquired compression scheme information and genre information is registered into the rule table 110 (step 101a of FIG. 19).

If such a DSP program parameter corresponding to the music piece ID of the music piece to be reproduced and acquired compression scheme information and genre information is already registered in the music piece rule table 110, the acquisition section 8 acquires the registered DSP program parameter, at step S102a. Operations of subsequent steps S103-S106 in FIG. 19 are the same as S103-S106 in the first embodiment.

Step S14 in FIG. 19 is directed to the same operation as step S14 in the first embodiment. Then, the control section 12a instructs the reproduction section 7a to reproduce the music piece to be reproduced, so that the reproduction section 7a reads out, from the recording medium 3, compressed sound data of the music piece in accordance with the instruction from the control section 12a. The reproduction section 7a includes a built-in decoder 71 and passes the compressed sound data, read out from the recording medium 3, to the decoder 71. Then, the decoder 71 decompresses the compressed sound data. After that, the reproduction section 7a outputs the sound data, decompressed by the decoder 71, to the amplifier apparatus 21, at step S15 of FIG. 5.

Steps S16 and S18 in FIG. 19 are directed to the same operations as steps S16 and S18 in the first embodiment, and step S17 is directed to the same operation as step S13 in the instant embodiment. If a change has been made to the effect process in the amplifier apparatus 21 during the reproduction of the music piece (YES determination at step S19), the control section 12a acquires, from the attribute information database, compression scheme information and genre information corresponding to the music piece ID of the music piece to be reproduced.

Then, the control section 12a delivers, to the rule table creation section 6a, the music piece ID of the currently-reproduced music piece, acquired compression scheme information and genre information, DSP program parameter acquired on the basis of a received message from the amplifier apparatus 21 and model ID acquired from the message. The rule table creation section 6a registers the music piece ID, compression scheme information, genre information, DSP program parameter and model ID, received from the control section 12a, in the rule table 110 in association with one another (step S20). If the corresponding DSP program parameter and model ID are already registered, they are updated. In this way, automatic learning of the rule table 110 is permitted in response to operation by the user. Steps S21 and S22 are directed to the same operations as steps S21 and S22 in the first embodiment.

Now, an effect process suitable for the compressed sound data is described. Data dropouts of the compressed sound data depend, to some degree, on the compression scheme employed; in fact, the data dropouts depend on music signal components to be processed and algorithms of the compression process. Namely, the data dropouts would vary depending on how much high-frequency components are contained in the original music signals; the high-frequency component contained in the compressed sound data tends to decrease as the bit rate decreases (i.e., the compression rate increases).

Therefore, fundamentally, it will suffice to select an appropriate frequency characteristic process, designed to correct medium- and high-frequency components, in accordance with degree of data deterioration of the compression scheme, and preset, in the rule table 110, a DSP program parameter corresponding to the selected frequency characteristic process. This way, an effect process suitable for reproduction of the compressed sound data can be performed automatically. In practice, depending on a combination of the compression scheme and musical genre, only a frequency characteristic process may be performed, or a frequency characteristic process and a sound field process may be performed in combination.

Fourth Embodiment

Whereas one DSP program parameter is registered for each music piece (music piece ID) in the above-described third embodiment, a plurality of DSP program parameters may be registered for each music piece ID as in the case of the second embodiment.

In such a case, processing start times may be added to the rule table 110 as in the above-described second embodiment. Reproduction processing performed in the fourth embodiment is substantially similar to that of the second embodiment described above in relation to FIG. 15. Namely, when an elapsed reproducing time of the music piece to be reproduced has coincided with the processing start time registered in the rule table 110 (YES determination at step S23 of FIG. 5), the DSP program parameter acquisition section 8a acquires, from the rule table 110, a DSP program parameter corresponding to that time and passes the acquired DSP program parameter to the control section 12a. Thus, the control section 12a executes a DSP program parameter setting process at step S24. In this way, the music piece can be reproduced while the effect process is changed in accordance with a change in the elapsed reproducing time.

If a change has been made to the effect process in the amplifier apparatus 21 during the reproduction of the music piece (YES determination at step S19), the control section 12a of the sound recording/reproducing apparatus 1a acquires, from the attribute information database, compression scheme information and genre information corresponding to the music piece ID of the currently-reproduced music piece.

Then, the control section 12a determines, as a processing start time, the elapsed reproducing time from the reproduction start time of the music piece to the current time, and it delivers, to the rule table creation section 6a, the music piece ID of the currently-reproduced music piece, determined processing start time, acquired compression scheme information and genre information, DSP program parameter acquired on the basis of a received message from the amplifier apparatus 21 and model ID acquired from the message.

The rule table creation section 6a registers the music piece ID, processing start time, compression scheme information, genre information, DSP program parameter and model ID, received from the control section 12a, in the rule table 110 in association with one another (step S20). In the above-described manner, the embodiment permits automatic learning by which the elapsed reproducing time when the user changed the effect process and the changed DSP program parameter are registered into the rule table 110.

In summary, the present invention described above is characterized in that not only attribute information on sound data of a music piece is recorded onto a recording medium but also a rule table is prepared to associate DSP program parameters and attribute information with each other and in that a DSP program parameter corresponding to attribute information on sound data of a music piece to be reproduced is acquired from the rule table and set in the DSP of the amplifier apparatus. With such arrangements, the present invention can perform control corresponding to information which only a reproducing apparatus or sound recording/reproducing apparatus can know (i.e., attribute information that is not reported sequentially to the outside by the reproducing apparatus or sound recording/reproducing apparatus), and thus can eliminate a need for the user to change settings of the DSP of the amplifier apparatus for each sound data set of the music piece. As a result, the present invention can reduce loads on the user necessary for setting the DSP of the amplifier apparatus. Further, because the reproducing apparatus or sound recording/reproducing apparatus controls the amplifier apparatus, the present invention can eliminate a need to provide separate equipment for controlling the amplifier apparatus. Thus, any existing amplifier apparatus can be used, so that the present invention can eliminate a need to add the DSP function to the reproducing apparatus or sound recording/reproducing apparatus.

Further, in the present invention, a processing start time, designating a start time of a sound field process or frequency characteristic process to be performed by a DSP, is added to the rule table so that a DSP program parameter, corresponding to attribute information on sound data of a music piece to be reproduced and corresponding to the processing start time having coincided with an elapsed reproducing time of the sound data are acquired from the rule table. With such arrangements, the present invention can reproduce the sound data of the music piece while changing the process to be performed by the DSP in accordance with the elapsed reproducing time of the sound data of the music piece, and thereby can perform control corresponding to a changing scene of the music piece.

Further, the present invention is characterized in that, when a change has been made to the sound field process or frequency characteristic process of the amplifier apparatus during reproduction of sound data of a music piece, a learning procedure is performed to register, in the rule table, a DSP program parameter indicative of the changed process and attribute information of the currently-reproduced sound data. Thus, the DSP program parameter changed by the user can be registered in the rule table, so that a DSP process suiting a preference of the user can be learned.

Furthermore, because music piece information, album information, artist information and genre information is used as the attribute information on sound data of a music piece, the present invention can perform a sound filed process or frequency characteristic process suitable for the music piece, album, artist and musical genre.

Moreover, with the arrangement that compression scheme information, indicative of a particular compression scheme with which sound data of a music piece are recorded on the recording medium, is used as attribute information on the sound data, the present invention can perform a sound field process or frequency characteristic process suitable for reproduction of the compressed sound data.

Fifth Embodiment

Figure 20:
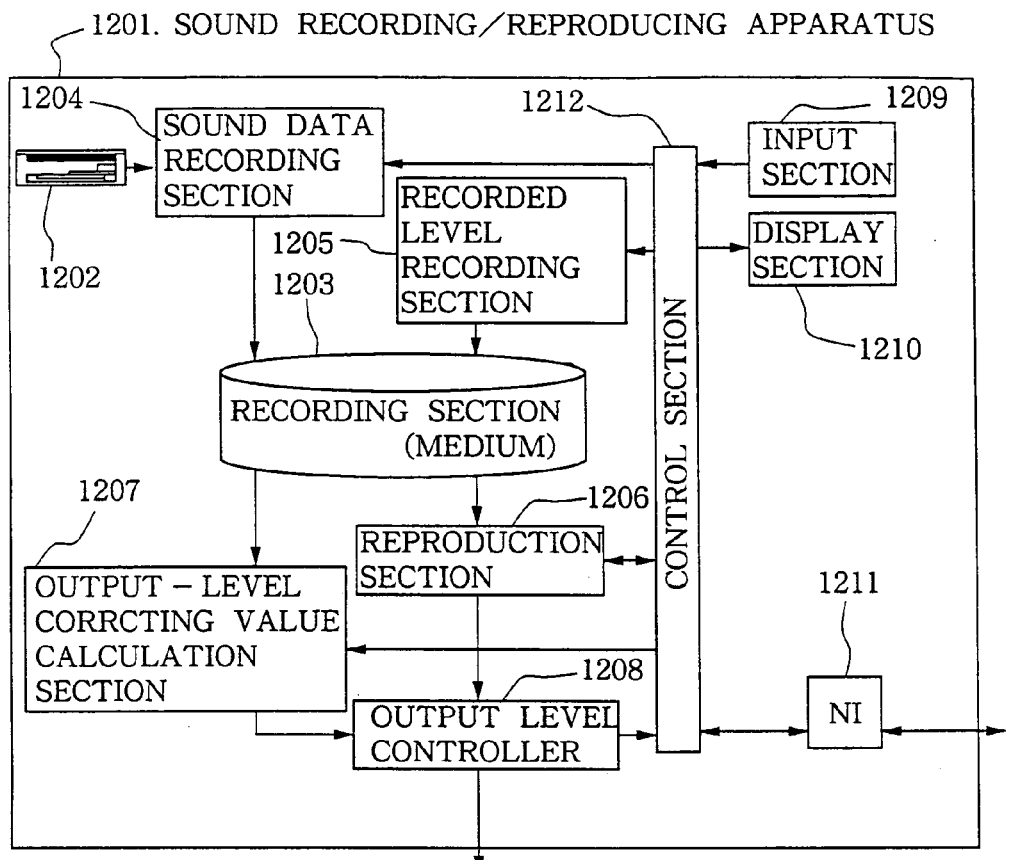
FIG. 20 is a block diagram showing a general setup of a sound recording/reproducing apparatus constituting a fifth embodiment of the present invention.

FIG. 20 is a block diagram showing a general setup of a sound recording/reproducing apparatus constituting a fifth embodiment of the present invention. The sound recording/reproducing apparatus 1201 includes a CD drive device 1202, a recording medium 1203, such as a hard disk or memory, on which sound data can be recorded and reproduced, a sound data recording section 1204 for recording sound data onto the recording medium 1203, and a recorded level recording section 1205 for detecting a recorded level of each music piece when the sound data are recorded onto the recording medium 1203 and recording, onto the recording medium 1203, the detected recorded level in association with the sound data of the corresponding music piece. The sound recording/reproducing apparatus 1201 also includes a reproduction section 1206 for reading out the sound data from the recording medium 1203 for reproduction of the sound data, an output-level correcting value calculation section 1207 for acquiring, from the recording medium 1203, the recorded level of a music piece to be reproduced and calculating an output level correcting value on the basis of the acquired recorded level, and an output level controller 1208 for adjusting the output level of the sound data on the basis of the calculated output level. The sound recording/reproducing apparatus 1201 also includes an input section 1209 for the user to give an instruction to the sound recording/reproducing apparatus 1201, a display section 1210 for visually displaying information to the user, a network interface section (NI) 1211 for connecting to the Internet, and a control section 1212 for controlling the entire recording/reproducing apparatus 1201. The output-level correcting value calculation section 1207 and output level controller 1208 together constitute an output level control section for adjusting the output level of the sound data to be output to the outside.

Figure 21:
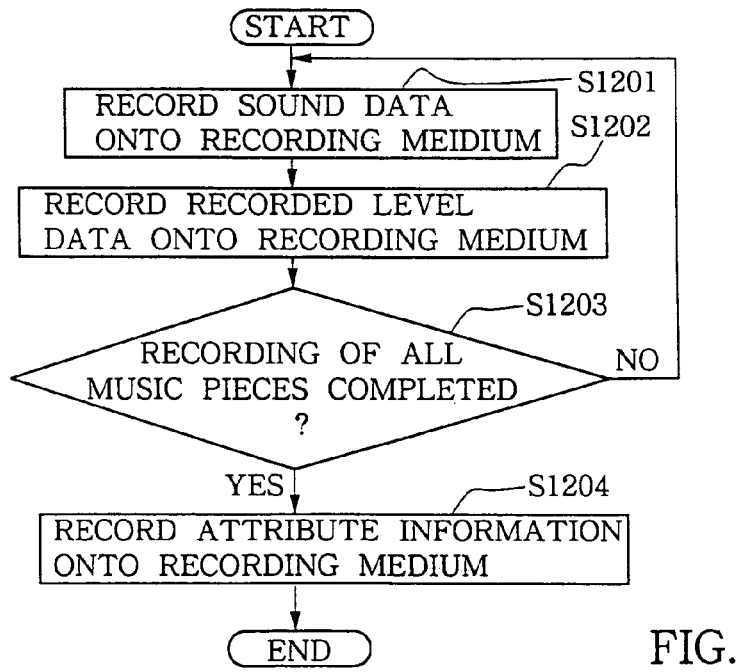
FIG. 21 is a flow chart of recording processing performed by the sound recording/reproducing apparatus of FIG. 20.

Now, a description will be given about recording processing performed by the sound recording/reproducing apparatus 1201 of FIG. 20, with reference to FIG. 21 that is a flow chart showing an exemplary step sequence of the recording processing. First, the user inserts a CD in the CD drive device 1202 and operates the input section 1209 to request sound data recording from the CD to the recording medium 1203. The control section 1212 controls the sound data recording section 1204 in accordance with the user's request so that the recording section 1204 reads out sound data of each music piece from the inserted CD and records the read-out sound data onto the recording medium 1203, at step S1201 of FIG. 21.

When the sound data are to be recorded at step S1201, the recorded level recording section 1205 detects a maximum recorded level LPE that is the greatest recorded level value and an average recorded level LAV of the sound data set of each music piece to be recorded. Then, for each of the music pieces to be recorded the recorded level recording section 1205 records, onto the recording medium 1203, recorded level data, indicative of the detected maximum recorded level LPE and average recorded level LAV, in association with the sound data of the music piece on which the recorded level detection has been made (step S1202).

The operations at steps S1201 and S1202 are carried out per user-designated music piece until sound data recording, onto the recording medium 3, of every user-designated music piece (all or a portion of music pieces recorded on the CD) is completed, i.e. until an YES determination is made at step S1203.

Then, at step S1204, the sound data recording section 1204 records, onto the recording medium 1203, respective attribute information of the music pieces in association with the sound data of the individual music pieces recorded at step S1201. The attribute information of each of the music pieces includes music piece information (name of the music piece), artist information (name of an artist of the music piece), album information (name of an album to which the music piece belongs), and genre information (name of a musical genre to which the music piece belongs).

The attribute information of any desired music piece can be acquired by the control section 1212 accessing a music CD information data server on the Internet, via the network interface section 1211, when a CD has been inserted in the CD drive device 1202. The control section 1212 passes the attribute information, acquired from the music CD information data server, to the sound data recording section 1204, so that the sound data recording section 1204 records, onto the recording medium 1203, the acquired attribute information in association with the sound data of the music piece. Alternatively, the attribute information of any desired music piece may be entered by the user manipulating the input section 1209.

Next, a description will be given about reproduction processing performed by the sound recording/reproducing apparatus 1201, with reference to FIG. 22 that is a flow chart showing an exemplary step sequence of the reproduction processing. First, the user manipulates the input section 1209 of the recording/reproducing apparatus 1201 to select a group of a plurality of music pieces to be reproduced (i.e., to-be-reproduced music piece group), at step S1211 of FIG. 22.

Examples of to-be-reproduced music piece groups, selectable in the instant embodiment, include one composed of a plurality of music pieces belonging to a same album, one composed of a plurality of music pieces performed by a same artist, one composed of a plurality of music pieces belonging to a same musical genre, one composed of a plurality of music pieces belonging to a same play list designated by the user, etc. The user may manipulate the input section 1209 to create a play list by designating desired music pieces, or designate an album, artist or musical genre.

When the user has designated a desired album, artist or musical genre, the control section 1212, by means of the reproduction section 1206, refers to the attribute information of the music pieces recorded on the recording medium 1203, and then the control section 1212 causes the name of every music piece corresponding to the designated album, artist or musical genre to be displayed on the display device 1210. Then, the user selects all or a portion of the music pieces displayed on the display device 1210. The control section 1212 stores the user-selected music pieces as a to-be-reproduced music piece group. Further, when the user has created a play list, the control section 1212 stores the music pieces named on the user-created play list as a to-be-reproduced music piece group.

Then, the control section 1212 informs the output-level correcting value calculation section 1207 of the to-be-reproduced music piece group selected at step S1211. In turn, the output-level correcting value calculation section 1207 acquires, from the recording medium 1203, the recorded level data (maximum recorded levels LPE and average recorded levels LAV) of the individual music pieces belonging to the to-be-reproduced music piece group notified from the control section 1212, and it then determines a reference recorded level LREF of the to-be-reproduced music piece group on the basis of the acquired recorded level data (step S1212).

For example, the reference recorded level LREF may be determined in any one of the following ways.

(A) The greatest value among the average recorded levels LAV of the individual music pieces belonging to the to-be-reproduced music piece is determined as the reference recorded level LREF.

(B) The smallest value among the average recorded levels LAV of the individual music pieces belonging to the to-be-reproduced music piece is determined as the reference recorded level LREF.

(C) Mean value of the average recorded levels LAV of the individual music pieces belonging to the to-be-reproduced music piece is determined as the reference recorded level LREF.

The reference recorded level LREF may also be determined in the following manner, instead of being determined from the recorded levels acquired from the recording medium 1203.

(D) Given value specific to the sound recording/reproducing apparatus 1201 is determined as the reference recorded level LREF, with no regard to the to-be-reproduced music piece group.

The output-level correcting value calculation section 1207 determines the reference recorded level LREF in any one of the ways mentioned at items (A)-(D) above. Each of the ways noted at items (A)-(C) above, which determines the reference recorded level LREF on the basis of the average recorded levels LAV of the individual music pieces belonging to the to-be-reproduced music piece group, can reduce a possibility of output level correction becoming too great or too small, as compared to the case where a given value specific to the recording/reproducing apparatus 1201 is determined as the reference recorded level LREF as noted at item (D) above; thus, each of the ways at items (A)-(C) can more appropriately adjust the respective sound volume levels of the music pieces belonging to the to-be-reproduced music piece group.

For purposes of the following description, let it now be assumed that, of the recorded level data acquired at step S1212, the average recorded level LAV of a music piece m belonging to the to-be-reproduced music piece group is LAVm and the maximum recorded value of the music piece m is LPEm.

The control section 1212 instructs the output-level correcting value calculation section 1207 to perform an output-level correcting value calculation process on the music piece "m" belonging to the to-be-reproduced music piece group. In accordance with the instruction from the control section 1212, the output-level correcting value calculation section 1207 calculates, on the basis of the following mathematical expressions, an average-recorded-level correcting value CAVm for correcting the average recorded level LAVm of the music piece m and a maximum-recorded-level correcting value CPEm for correcting the maximum recorded level LPEm of the music piece m, at step S1213:

$$CAVm = LREF/LAVm \quad (1)$$

$$CPEm = LMAX/LPEm \quad (2)$$

In mathematical expression (2), "LMAX" represents a maximum recorded level which the sound recording/reproducing apparatus 1201 can take.

Then, the output-level correcting value calculation section 1207 compares the calculated average-recorded-level correcting value CAVm and the calculated maximum-recorded-level correcting value CPEm, at step S1214. If the calculated average-recorded-level correcting value CAVm is equal to or smaller than the calculated maximum-recorded-level correcting value CPEm, the output-level correcting value calculation section 1207 sets the average-recorded-level correcting value CAVm as an output-level correcting value COLm of the music piece m, at step S1215. If, on the other hand, the calculated average-recorded-level correcting value CAVm is greater than the calculated maximum-recorded-level correcting value CPEm, the output-level correcting value calculation section 1207 sets the maximum-recorded-level correcting value CPEm as the output-level correcting value COLm of the music piece m, at step S1216.

The reason why the smaller of the calculated average-recorded-level correcting value CAVm and maximum-recorded-level correcting value CPEm is set as the output-level correcting value COLm of the music piece m is to prevent a product, calculated by multiplying the sound data of the music piece m by an output level volume value as will be later described, from being saturated beyond a maximum value that can be output by the sound recording/reproducing apparatus 1201.

Then, the control section 1212 instructs the reproduction section 1206 to reproduce the music piece m, and the reproduction section 1206 reproduces the music piece m as instructed by the control section 1212 (step S1217).

The output level controller 1208 includes an output level volume control (not shown) for adjusting the output level of the sound data output by the reproduction section 1206. The output level controller 1208 sets a reproducing output level volume value Vm of the music piece m as represented by mathematical expression (3) below and multiplies the sound data of the music piece m by the output level volume value Vm, so as to outputs the multiplied result to the outside as level-corrected sound data of the music piece m (step S1218).

$$Vm = VREF \times COLm \quad (3)$$

In mathematical expression (3), "VREF" represents a reference volume value of the output level volume control.

The sound data of the music piece m are output from a speaker after being amplified via a not-shown AV amplifier or the like, or recorded onto a recording medium via other recording equipment (not shown).

Then, the user can manually manipulate the output level volume control during reproduction of the music piece m. When the user has manually manipulated the output level volume control during reproduction of the music piece m (YES determination at step S1219), the output level controller 1208 modifies the memory-stored reference volume value VREF in accordance with mathematical expression (4) below, at step S1220. In an operation of succeeding step S1218, the thus-modified reference volume value VREF is used.

$$VREF = Vu/COLm \quad (4)$$

In mathematical expression (4), "Vu" represents a user-set value of the output level volume control.

The operations of steps S1218-S1220 are repeated until the reproduction of the music piece m is completed, i.e. until an YES determination is made at step S1221. After completion of the reproduction of the music piece m, the control section 1212 further determines at step S1222 whether reproduction of all the music pieces in the to-be-reproduced music piece group has been completed. If reproduction of all the music pieces has not been completed, the control section 1212 reverts to step S1213 to reproduce the next music pieces. In this way, the operations of steps S1213-S1222 are performed for each of the music pieces in the to-be-reproduced music piece group.

After the reproduction of all the music pieces has been completed as determined at step S1222, the control section 1212 instructs the output level controller 1208 to return the value of the output level volume control Vm to the reference volume control VREF, at step S1223.

In the above-described manner, the instant embodiment adjusts the value of the output level volume control as if all the music pieces belonging to the music piece group had been recorded at the reference recorded level, and it can effectively absorb unevenness in the recorded level among the music pieces. Thus, the instant embodiment can reproduce all the music pieces, or record all the music pieces onto another recording medium, at a substantially uniform volume level.

Further, with the arrangement that recorded level is detected during recording of the sound data and recorded on the recording medium 1203 along with the sound data, the instant embodiment can eliminate a need to perform operations including one for detecting the recorded level by reproducing the sound data at high speed, and therefore it can promptly reproduce any desired music piece without taking a long time for pre-reproduction operations.

Sixth Embodiment

Figure 23:
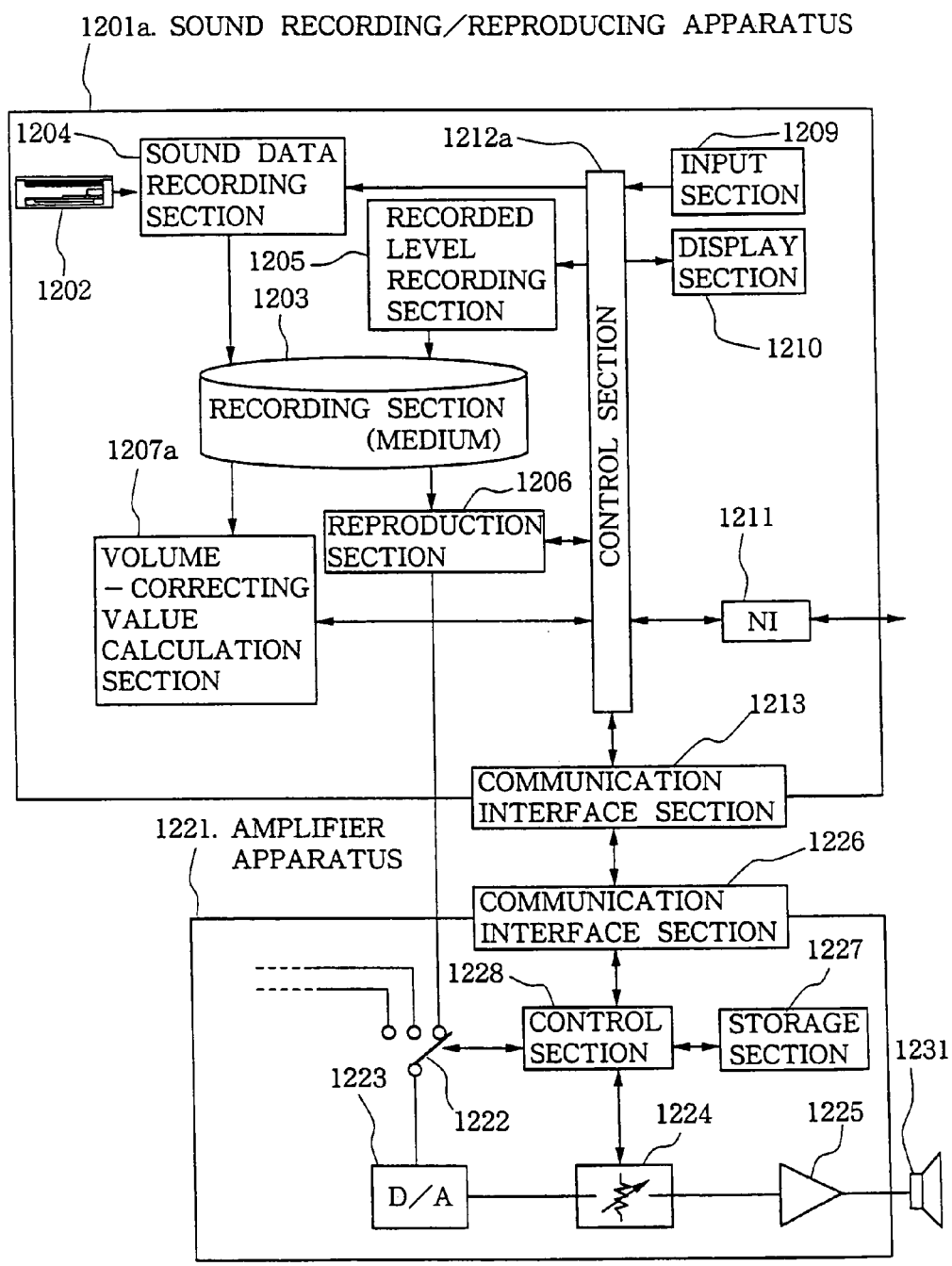
FIG. 23 is a block diagram showing a general setup of a sound recording/reproducing system in accordance with a sixth embodiment of the present invention.

FIG. 23 is a block diagram showing a general setup of a sound recording/reproducing system constituting a sixth embodiment of the present invention, where the same elements as in FIG. 20 are represented by the same reference numerals. The sound recording/reproducing system in the sixth embodiment includes a sound recording/reproducing apparatus 1201a having a function of acquiring a status from an amplifier apparatus and a function of performing volume control on the amplifier apparatus, the amplifier apparatus 1221 capable of being volume-controlled from the outside, and a speaker 1231 driven by the amplifier apparatus 1221.

The sound recording/reproducing apparatus 1201a includes a CD drive device 1202, a recording medium 1203, a sound data recording section 1204, a recorded level recording section 1205, a reproduction section 1206, a volume correcting value calculation section 1207a for acquiring, from the recording medium 1203, a recorded level of each music piece to be reproduced and calculating a volume correcting value on the basis of the acquired recorded level, an input section 1209, a display section 1210, a network interface section 1211, a control section 1212a for controlling the entire recording/reproducing apparatus 1201a and controlling a volume control of the amplifier apparatus 1221 on the basis of the calculated volume correcting value, and a communication interface section 1213 for performing bidirectional communication with the amplifier apparatus 1221.

The amplifier apparatus 1221 includes an input selector 1222 for selecting a desired sound input from among a plurality of sound sources, a D/A converter 1223 for converting the sound data output from the input selector 1222 into an analog sound signal, a volume control 1224 for adjusting the level of the analog sound signal output from the D/A converter 1223, a power amplifier 1225 for amplifying the analog sound signal output from the volume control 1224, a communication interface section 1226 for executing bidirectional communication with the sound recording/reproducing apparatus 1201a. The amplifier apparatus 1221 also includes a storage section 1227, and a control section 1228 for controlling the entire amplifier apparatus 1221. For example, a communication protocol to be used between the communication interface sections 1213 and 1226 of the sound recording/reproducing apparatus 1201a and amplifier apparatus 1221 may be an RS-232C protocol. Note that, whereas the sound recording/reproducing apparatus 1201a is shown in FIG. 23 as outputting a digital sound signal, the recording/reproducing apparatus 1201a may output an analog sound signal; in the latter case, the D/A converter 1223 may be dispensed with.

Figure 24:
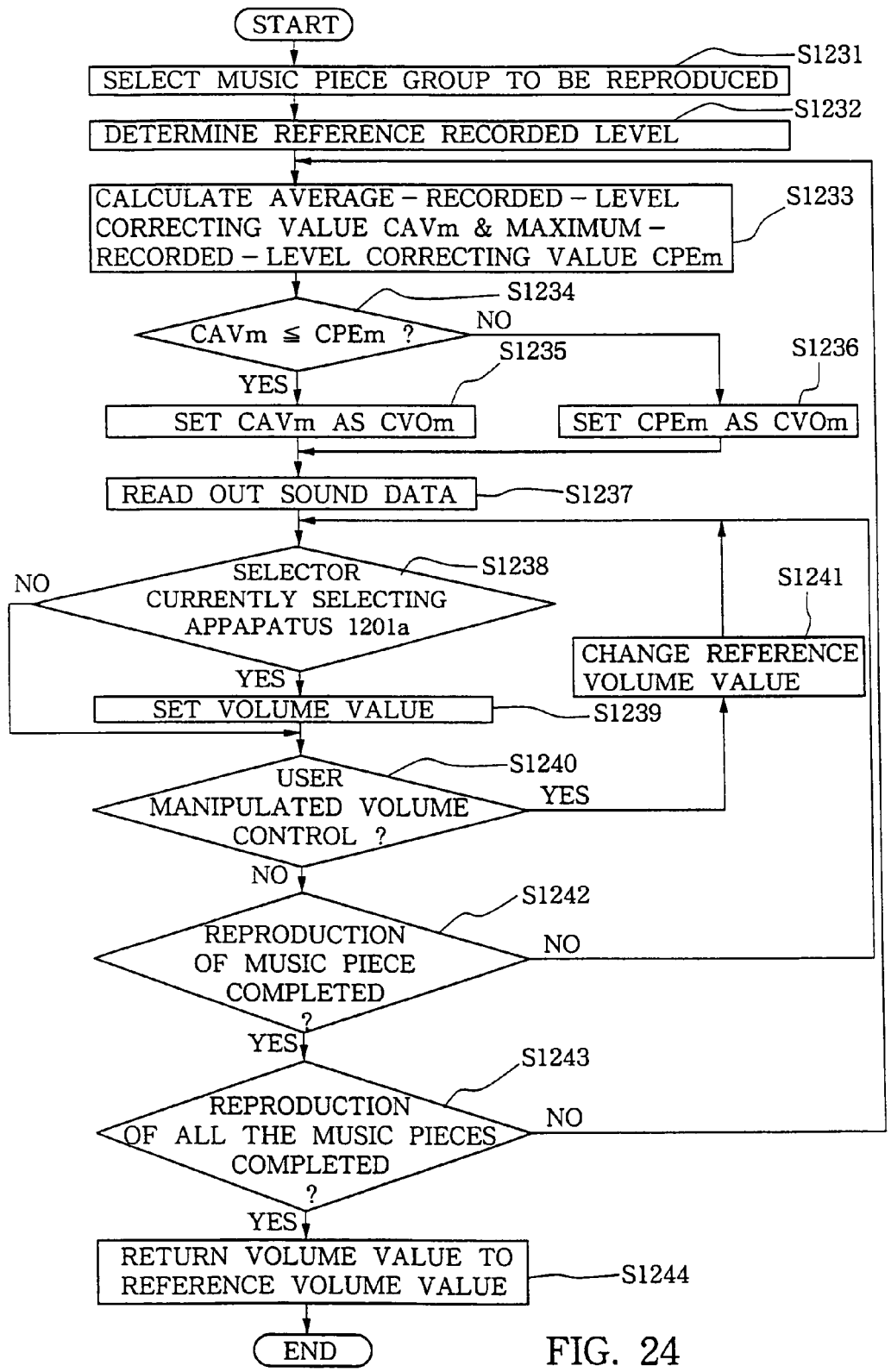
FIG. 24 is a flow chart of reproduction processing performed by a sound recording/reproducing apparatus of FIG. 23.

Recording processing performed by the sound recording/reproducing apparatus 1201a in the sixth embodiment is similar to that in the fifth embodiment. Description will be given about reproduction processing performed by the sound recording/reproducing apparatus 1201a, with reference to FIG. 24 that is a flow chart showing an exemplary step sequence of the reproduction processing. In FIG. 24, step S1231 is directed to the same operation as step S1211 of FIG. 22.

The control section 1212a informs the volume correcting value calculation section 1207a of a to-be-reproduced music piece group selected at step S1231, and the volume correcting value calculation section 1207a determines a reference recorded level LREF of the selected to-be-reproduced music piece group, at step S1232. The reference recorded level LREF is determined here in the same manner as set forth in relation to step S1212 of FIG. 22.

Figure 22:
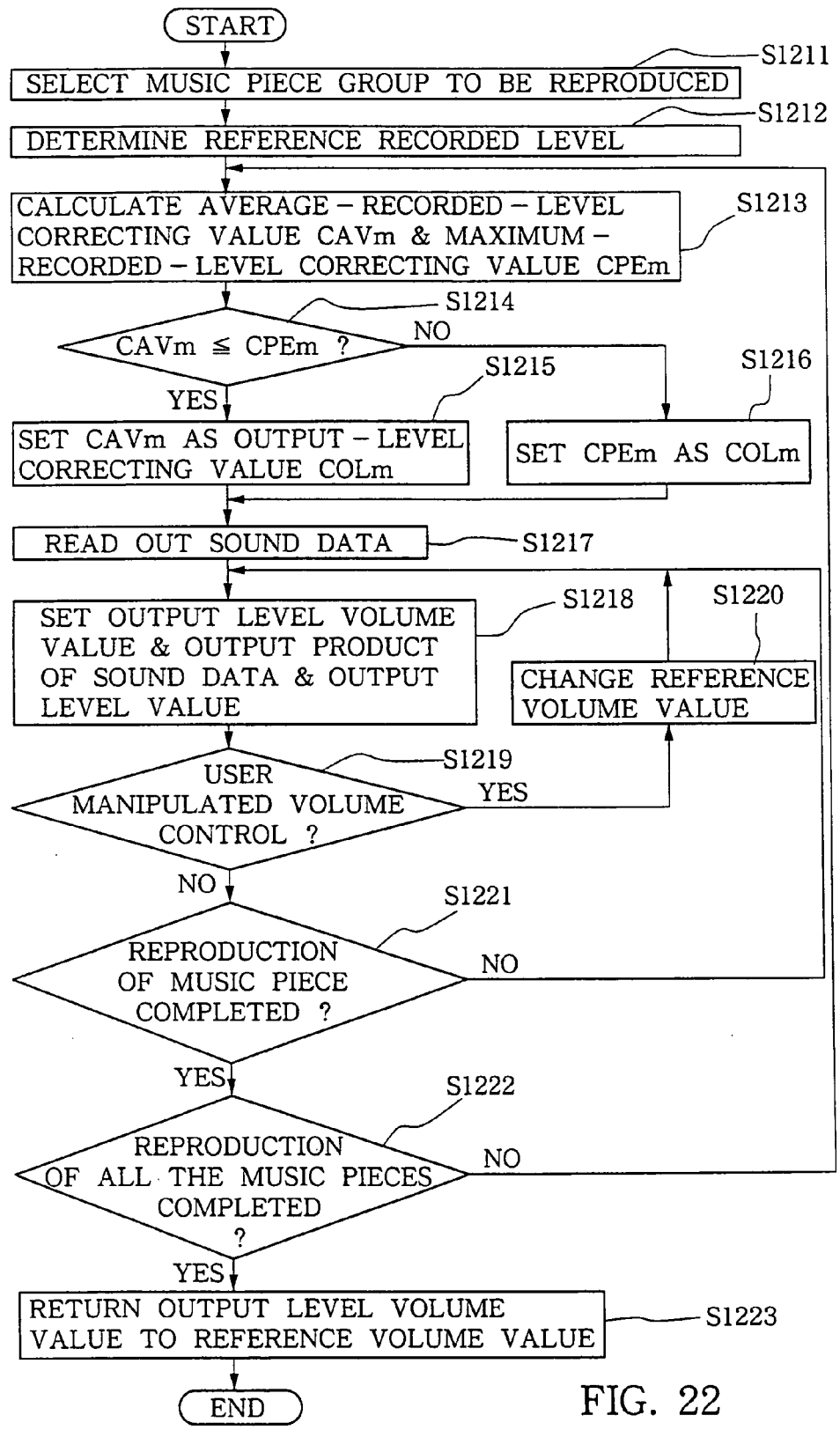
FIG. 22 is a flow chart of reproduction processing performed by the sound recording/reproducing apparatus of FIG. 20.

Then, the volume correcting value calculation section 1207a calculates an average-recorded-level correcting value CAVm and maximum-recorded-level correcting value CPEm of a music piece m belonging to the to-be-reproduced music piece group, at step S1233, in generally the manner as at step S1213 of FIG. 22.

Then, the volume correcting value calculation section 1207a compares the calculated average-recorded-level correcting value CAVm and the calculated maximum-recorded-level correcting value CPEm, at step S1234. If the calculated average-recorded-level correcting value CAVm is equal to or smaller than the calculated maximum-recorded-level correcting value CPEm, the volume correcting value calculation section 1207a sets the average-recorded-level correcting value CAVm as a volume correcting value CVOm of the music piece m, at step S1235. If, on the other hand, the calculated average-recorded-level correcting value CAVm is greater than the calculated maximum-recorded-level correcting value CPEm, the volume correcting value correcting value calculation section 1207*a* sets the maximum-recorded-level correcting value CPEm as the volume correcting value CVOm of the music piece m, at step S1236.

The reason why the smaller of the calculated average-recorded-level correcting value CAVm and maximum-recorded-level correcting value CPEm is set as the volume correcting value CVOm of the music piece m is to prevent the inconvenience that a sound greater in volume than a maximum sound volume output when the volume control is at the reference volume value VAREF is output due to the automatic volume control.

For example, when a music piece having a relatively small average recorded level and a relatively great maxim recorded level is reproduced, it can be expected that the calculated average-recorded-level correcting value CAVm becomes a great value. In such a case, if the average-recorded-level correcting value CAVm is set directly as the volume correcting value, the volume greatly increases so that an excessive sound volume is produced in a peak portion of the music piece. The excessive sound volume is one that can never be output when the volume control is at the reference volume value VAREF and that is beyond expectation of the user.

Therefore, if the smaller of the calculated average-recorded-level correcting value CAVm and maximum-recorded-level correcting value CPEm is set as the volume correcting value CVOm, it is possible to avoid output of such an excessive sound volume beyond the maximum sound volume that can be output when the volume control is at the reference volume value VAREF; thus, this approach can effectively avoid a situation where excessive sound volume beyond the expectation of the user is produced due to the automatic volume control.

Then, the control section 1212*a* instructs the reproduction section 1206 to reproduce the music piece m, and the reproduction section 1206 reproduces the music piece m as instructed by the control section 1212*a* (step S1237).

After that, the control section 1212*a* periodically transmits a status acquisition command to the amplifier apparatus 1221 via the communication interface section 1213, to ascertain the current status of the amplifier apparatus 1221. FIG. 25A is a diagram showing a format of a control command given from the sound recording/reproducing apparatus 1201*a*, and FIG. 25B is a diagram showing a format of a message given from the amplifier apparatus 1221 in response to a status acquisition command received from the recording/reproducing apparatus 1201*a*.

As shown in FIG. 25A, the control command given from the sound recording/reproducing apparatus 1201*a* includes an STX (Start of Text) delimiter 1401 of, for example, a one byte length indicative of the beginning of the control command, a command field 1402, an option field 1403, and an ETX (End of Text) delimiter 1404, for example, of a one byte length indicative of the end of the control command.

For example, if the value stored in the command field 1402 is "1", it means that the control command is a status acquisition command to acquire a status of the amplifier device 1221. If the value of the command field 1402 is "2", the control command is a volume setting command to set a volume value of the amplifier apparatus 1221.

In the option field 1403, there is stored an argument of the control command; for example, in the case of the volume setting command, a volume value to be set from the recording/reproducing apparatus 1201*a* to the amplifier apparatus 1221 is stored in the option field 1403.

Message given from the amplifier apparatus 1221 includes an STX delimiter 1501 indicative of the beginning of the message, a model ID field 1502, a volume field 1503, an input selector field 1504, and an ETX delimiter 1505 indicative of the end of the control message.

In the model ID field 1502, there is stored a model ID identifying the model of the amplifier apparatus 1221. In the volume field 1503, there is stored a current value of the volume control 1224 of the amplifier apparatus 1221. In the input selector field 1504, there is stored an input code indicative of a current state of the input selector 1222 of the amplifier apparatus 1221.

On the recording medium 1203 of the sound recording/reproduction apparatus 1201*a*, there is prestored an input code table 1301, as shown in FIG. 26, which associates input codes common to all possible models of amplifier apparatus 1221 and input terminals of the individual models. On the recording medium 1227 of the amplifier apparatus 1221, on the other hand, there is prestored an input code table 1302, as shown in FIG. 27, which associates input codes and the input terminals of the apparatus 1221. FIG. 27 shows an example of the input code table 1302 provided in the amplifier apparatus 1221 of model ID "1".

Correspondency between the input codes and the input terminals of the amplifier apparatus 1221 is determined for each of the models of amplifier apparatus 1221. For example, in the amplifier apparatus 1221 of model IDs "1" and "2", an input code "0" indicates that the input selector 1222 is currently selecting a "CD" input terminal. In the amplifier apparatus 1221 of model ID "1", an input code "6" indicates that the input selector 1222 is currently selecting a "V-AUX" input terminal.

At the same time the control section 1212*a* of the sound recording/reproduction apparatus 1201*a* instructs the reproduction section 1206 to reproduce the music piece of music piece ID "m", it transmits a status acquisition command to the amplifier apparatus 1221 via the communication interface section 1213.

Once the control section 1228 of the amplifier apparatus 1221 receives the status acquisition command via the communication interface section 1226, it returns, to the sound recording/reproduction apparatus 1201*a* via the communication interface section 1226, a message storing an input code in the input selector field 1504. The control section 1228 determines an input code, corresponding to the input terminal selected by the input selector 1222, on the basis of the input code table 1302.

The control section 1212*a* of the sound recording/reproduction apparatus 1201*a* acquires a model ID from the model ID field 1502 of the message received from the amplifier apparatus 1221 via the communication interface section 1213. In this way, the control section 1212*a* can acquire the model ID of the to-be-controlled amplifier apparatus 1221 currently connected to the sound recording/reproduction apparatus 1201*a*.

Then, the control section 1212*a* acquires the input code from the input selector field 1504 of the received message and ascertains whether or not the input selector 1222 of the amplifier apparatus 1221 is currently selecting the sound recording/reproduction apparatus 1201*a* which the control section 1212*a* belongs to (step S1238).

No input code corresponding to the sound recording/reproduction apparatus 1201*a* is stored in the example of FIG. 26 or 27. However, if a sound output of the sound recording/reproduction apparatus 1201*a* is connected to the "V-AUX" input terminal of the amplifier apparatus 1221 of model ID "1", it will suffice for the user to previously register "V-AUX"

in the control section 1212*a* as an input terminal of the recording/reproduction apparatus 1201*a*.

Thus, when the model ID and input code have been acquired from the received message, and if the input terminal corresponding to the model ID and input code is "V-AUX" on the input code table 1301, the control section 1212*a* of the recording/reproduction apparatus 1201*a* determines that the input selector 1222 of the amplifier apparatus 1221 is currently selecting that recording/reproduction apparatus 1201*a*; however, if the input terminal corresponding to the model ID and input code is not "V-AUX", the control section 1212*a* can determine that the input selector 1222 is not currently selecting that recording/reproduction apparatus 1201*a*.

If the input selector 1222 is currently selecting the recording/reproduction apparatus 1201*a*, the control section 1212*a* performs a volume value setting process on the amplifier apparatus 1221 at step S1239. In the volume value setting process, the control section 1212*a* calculates a value VAm of the volume control 1224 of the amplifier apparatus 1221 as represented by the following mathematical expression:

$$VAm = VAREF \times CVOm \quad (5)$$

In mathematical expression (5), "VAREF" represents a reference volume value of the volume control 1224.

After that, the control section 1212*a* stores the thus-calculated volume value VAm in the option field 1403 of the volume setting command, and it transmits the volume setting command to the amplifier apparatus 1221 via the communication interface section 1213.

Then, the control section 1228 of the amplifier apparatus 1221, having received the volume setting command via the communication interface section 1226, acquires the volume value VAm from the option field 1403 of the volume setting command and sets the volume control 1224 to the volume value VAm. Then, the volume value setting process is brought to an end.

The sound data of the music piece m output from the sound recording/reproduction apparatus 1201*a* is passed via the input selector 1222 to the D/A converter 1223 for conversion into an analog sound signal, which is delivered via the volume control 1224 to the power amplifier 1225 to be amplified and then output via the speaker 1231.

Then, the user can manually manipulate the volume control 1224 of the amplifier apparatus 1221 during reproduction of the music piece m. The control section 1212*a* of the sound recording/reproduction apparatus 1201*a* periodically transmits the above-mentioned status acquisition command to the amplifier apparatus 1221. In response to the status acquisition command from the recording/reproduction apparatus 1201*a*, the control section 1228 of the amplifier apparatus 1221 returns, to the sound recording/reproduction apparatus 1201*a* via the communication interface section 1226, a message storing the current value VAu of the volume control 1224 in the volume field 1503.

The control section 1212*a* of the sound recording/reproduction apparatus 1201*a* receives the message from the amplifier apparatus 1221 and acquires the volume value from the volume field 1503 of the message. Then, the control section 1212*a* updates the stored reference volume value VAREF with the acquired volume value VAu in accordance with the following mathematical expression. In an operation of succeeding step S1239, the thus-updated reference volume value VAREF is used.

$$VAREF = VAu / CVOm \quad (6)$$

As the user manually manipulates the volume control 1224 during the reproduction of the music piece m (YES determination at step S1240), the volume value VAu varies so that the reference volume value VAREF is also varied (step S1241).

The operations of steps S1238-S1241 are repeated until the reproduction of the music piece m is completed, i.e. until an YES determination is made at step S1242. After completion of the reproduction of the music piece m, the control section 1212*a* further determines at step S1243 whether reproduction of all the music pieces in the to-be-reproduced music piece group has been completed. If the reproduction of all the music pieces has not been completed, the control section 1212*a* reverts to step S1233 to reproduce the next music pieces. In this way, the operations of steps S1233 S1243 are performed for each of the music pieces (i.e., first to last music pieces) in the to-be-reproduced music piece group.

After the reproduction of all the music pieces has been completed as determined at step S1243, the control section 1212*a* stores the reference volume value VAREF into the option field 1403 of the volume setting command, and it transmits the volume setting command to the amplifier apparatus 1221. The control section 1228 of the amplifier apparatus 1221 acquires the reference volume value VAREF from the option field 1403 of the volume setting command and sets the volume control 1224 to the value VAREF (step S1244).

When the user has operated the input selector 1222 during the reproduction of the music piece, there occurs a change in the input code of the message periodically transmitted from the amplifier apparatus 1221. If the control section 1212*a* of the sound recording/reproduction apparatus 1201*a* determines, from the input code in the received message, that the input selector 1222 of the amplifier apparatus 1221 is not currently selecting the recording/reproduction apparatus 1201*a* which the control section 1212*a* belongs to (NO determination at step S1238), it does not perform the volume value setting process.

However, execution of the reproduction operations of steps S1233-S1238 and S1240-S1244, excluding that of step S1239, in the sound recording/reproduction apparatus 1201*a* is continued unless the user gives a particular instruction for discontinuing the reproduction. When the user has selected the sound recording/reproducing apparatus 1*a* via the input selector 1222 of the amplifier apparatus 1221, the volume value setting operation of step S1239 is resumed.

Further, even when the input selector 1222 of the amplifier apparatus 1221 is not currently selecting the recording/reproduction apparatus 1201*a*, the operations of steps S1240 and S1241 are carried out if the user operates the volume control 1224. Thus, if the user operates the volume control 1224 while the input selector 1222 of the amplifier apparatus 1221 is not currently selecting the recording/reproduction apparatus 1201*a*, the reference volume value VAREF is varied as noted above, so that the varied reference volume value VAREF will be used after the resumption of the volume value setting operation of step S1239.

In the above-described manner, the sixth embodiment adjusts the value of the volume control 1224 as if all the music pieces belonging to the music piece group had been recorded at the reference recorded level, and thus it can effectively absorb unevenness in the recorded level and thus can reproduce the music pieces at a substantially uniform level. Further, the sixth embodiment can promptly reproduce any desired music piece without taking a long time for pre-reproduction operations, as in the case of the fifth embodiment.

It is desirable, from the viewpoint of sound quality, that the sound volume adjustment be performed at the final output stage; thus, the sixth embodiment is arranged to control the volume control 1224 of the amplifier apparatus 1221 from the sound recording/reproduction apparatus 1201a, so that the sound volume can be adjusted in a manner optimal to the sound quality.

In each of the fifth and sixth embodiments, in case no recorded level data of a given music piece belonging to a to-be-reproduced music piece group could not be recorded on the recording medium due to some reason or other, the control section 1212 or 1212a, prior to initiation of the operation of step S1212 or S1232, causes the recorded level recording section 1205 to scan at high speed the sound data corresponding to the non-recorded recorded level so that the section 1205 detects the maximum recorded level LPE and average recorded level LAV of the music piece to record the detected recorded level data onto the recording medium 1203 in association with the sound data of the music piece.

Further, each of the fifth and sixth embodiments has been described above in relation to the case where the to-be-reproduced group comprises a plurality of music pieces. However, if only one music piece belongs to the to-be-reproduced group, then a given value specific to the sound recording/ reproducing apparatus 1201 or 1201a may be determined as the reference recorded level LREF as noted at item (D) in relation to step S1212.

Furthermore, each of the fifth and sixth embodiments has been described above as using mechanically-calculated average recorded levels. However, since such mechanically-calculated average recorded levels sometime fail to appropriately coincide with auditory average levels (i.e., average levels perceived by the ears of the user), there may be provided, in addition to the normal mode, a mode for correcting the average recorded levels to thereby set auditory average levels of individual music pieces, and the thus-set average levels may be used in place of the average recorded levels.

In summary, the present invention described above is characterized by performing: a recorded level recording step of, when sound data are to be recorded onto a recording medium, detecting a recorded level of each predetermined succession of the sound data and recording, onto the recording medium, the detected recorded level in association with the predetermined succession of the sound data; and an output level control step of, when sound data read out from the recording medium are to be output for reproduction, acquiring the recorded level of a predetermined succession of the sound data to be reproduced and adjusting, on the basis of the acquired recorded level and a reference recorded level, an output level of the succession of the sound data to be reproduced. With such arrangements, the present invention can adjust the output level of the succession of the sound data (e.g., sound data of a music piece) as if the succession of the sound data had been recorded at the reference recorded level. Therefore, the present invention can effectively absorb unevenness in the recorded level, so that it can reproduce any desired succession of the sound data from the recording medium, or record each succession of the sound data onto another recording medium, at a substantially uniform level. Further, because the recorded level is detected and recorded onto the recording medium in association with the sound data during recording of the sound data, the present invention can eliminate a need to perform extra operations, such as one for detecting the recorded level by reproducing the sound data at high speed, and therefore can promptly reproduce any desired succession of the sound data without taking a long time for pre-reproduction operations.

The present invention described above is further characterized by performing: a recorded level recording step of, when sound data are to be recorded onto a recording medium, detecting a recorded level of each predetermined succession of the sound data and recording, onto the recording medium, the detected recorded level in association with the predetermined succession of the sound data; and a volume control step of, when sound data read out from the recording medium are to be output to an amplifier apparatus having a volume control capable of being controlled from the outside, acquiring the recorded level of a predetermined succession of the sound data to be reproduced and controlling, on the basis of the acquired recorded level and a reference recorded level, the volume control of the amplifier apparatus. With such arrangements, the present invention can control the volume control of the amplifier apparatus as if the succession of the sound data had been recorded at the reference recorded level. Therefore, the present invention can effectively absorb unevenness in the recorded level, so that it can reproduce any desired succession of the sound data from the recording medium at a substantially uniform level. Further, because the recorded level is detected and recorded onto the recording medium in association with the sound data during recording of the sound data, the present invention can eliminate a need to perform extra operations, such as one for detecting the recorded level by reproducing the sound data at high speed, and therefore it can promptly reproduce any desired succession of the sound data without taking a long time for pre-reproduction operations. In addition, because the present invention controls the volume control of the amplifier apparatus without performing sound volume adjustment in the sound recording/reproducing apparatus, it can execute the sound volume adjustment in a manner optimal for sound quality.

Further, with the arrangement that the reference recorded level is determined on the basis of a plurality of recorded levels corresponding to plural successions of the sound data to be reproduced, the present invention can more appropriately adjust the output level of the sound data or volume control of the amplifier apparatus as compared to the case where fixed values having no relation to the successions of the sound data are used as the reference recorded level.

The present invention relates to the subject matter of Japanese Patent Application Nos. 2002-240358 and 2002-246827 filed on Aug. 21 and Aug. 27, 2002, the disclosure of which is expressly incorporated herein by reference in its entirety.

What is claimed is:
1. A sound recording/reproducing method in a sound recording/reproducing apparatus for recording sound data onto a recording medium and reproducing said sound data from said recording medium, the method comprising:
   an attribute information recording step of recording, onto said recording medium, attribute information on sound data of a music piece that are to be recorded onto said recording medium;
   a rule table creation step of creating a rule table that associates the attribute information and digital signal processor (DSP) program parameters, each of the digital signal processor (DSP) program parameters being previously stored in the sound recording/reproducing apparatus and designating a sound field process or a frequency characteristic process, the sound field process or the frequency characteristic process to be performed on a digital signal processor in a connected amplifier apparatus;
   a DSP program parameter acquisition step of, at a time of reproduction when sound data of a music piece to be reproduced, read out from said recording medium, are to be outputted to said amplifier apparatus that is currently connected to said sound recording/reproducing apparatus, acquiring, from said recording medium, the attribute information on the sound data of the music piece to be reproduced and acquiring, from said rule table, any of the DSP program parameters that corresponds to the attribute information;

a step of using, when a model of an amplifier apparatus that is the object of control during creation of said rule table and a model of said amplifier apparatus that is currently connected to said sound recording/reproducing apparatus coincide with each other, said DSP program parameter acquired from said rule table as a DSP program parameter after completion of the acquisition process;

a step of using, when the model of an amplifier apparatus that is the object of control during creation of said rule table differs from the model of said amplifier apparatus that is currently connected to said sound recording/reproducing apparatus, a DSP program parameter acquired from said rule table and a DSP program parameter corresponding to said amplifier apparatus that is currently connected to said sound recording/reproducing apparatus from a DSP program associating table that associates DSP program parameters of a plurality of amplifier apparatuses, and using said DSP program parameter acquired from said DSP program associating table as a DSP program parameter after completion of the acquisition process; and a DSP program parameter setting step of setting the DSP program parameter, after completion of the acquisition step, in said digital signal processor of said amplifier apparatus that is currently connected to said sound recording/reproducing apparatus.

2. A sound recording/reproducing method as claimed in claim 1 wherein, when a change has been made to the sound field process or frequency characteristic process of said amplifier apparatus during reproduction of the sound data of the music piece, there is performed a learning step of registering, in said rule table, a DSP program parameter indicative of the changed sound field process or frequency characteristic process in association with the attribute information of the sound data being currently reproduced.

3. A sound recording/reproducing method as claimed in claim 1 wherein the attribute information on the sound data of the music piece includes music piece information identifying the music piece, album information identifying an album to which the music piece belongs, artist information identifying an artist of the music piece, and genre information identifying a musical genre of the music piece.

4. A sound recording/reproducing method as claimed in claim 1 wherein the attribute information on the sound data of the music piece includes compression scheme information indicative of a compression scheme with which the sound data are recorded on said recording medium.

5. A sound recording/reproducing apparatus comprising:
a recording medium on which sound data can be recorded and reproduced;
an attribute information recording section that records, onto said recording medium, attribute information on sound data of a music piece that are to be recorded onto said recording medium;
a rule table creation section that creates a rule table that associates the attribute information, digital signal processor (DSP) program parameters and processing start times, each of the digital signal processor (DSP) program parameters being previously stored in the sound recording/reproducing apparatus and designating a sound field process or a frequency characteristic process, the sound field process or the frequency characteristic process to be performed on a digital signal processor in a connected amplifier apparatus, each of the processing start times designating a time when the sound field process or the frequency characteristic process is started;

a DSP program parameter acquisition section that, at a time of reproduction when sound data of a music piece to be reproduced, read out from said recording medium, are to be outputted to said amplifier apparatus which is currently connected to said sound recording/reproducing apparatus, acquires, from said recording medium attribute information of sound data to be reproduced and acquires, from said rule table, any of the DSP program parameters that corresponds to the attribute information on the sound data;

a section that uses, when a model of an amplifier apparatus that is the object of control during creation of said rule table and a model of said amplifier apparatus that is currently connected to said sound recording/reproducing apparatus coincide with each other, said DSP program parameter acquired from said rule table as a DSP program parameter after completion of the acquisition process;

a DSP program associating table associating DSP program parameters of a plurality of amplifier apparatus;

a section that acquires, when the model of an amplifier apparatus that is the object of control during creation of said rule table differs from the model of said amplifier apparatus that is currently connected to said sound recording/reproducing apparatus, a DSP program parameter corresponding to said amplifier apparatus that is currently connected to said sound recording/reproducing apparatus from said DSP program associating table, and uses said DSP program parameter acquired from said DSP program associating table as a DSP program parameter after completion of the acquisition process; and a DSP program parameter setting section that sets the DSP program parameter, after completion of the acquisition process, in said digital-signal processor of said amplifier apparatus currently connected to said sound recording/reproducing apparatus.

6. A sound recording/reproducing apparatus as claimed in claim 5 which further comprises a learning section that, when a change has been made to the sound field process or frequency characteristic process of said amplifier apparatus during reproduction of the sound data of the music piece, registers, in said rule table, a DSP program parameter indicative of the changed sound field process or frequency characteristic process in association with the attribute information of the sound data being currently reproduced.

7. A sound recording/reproducing apparatus as claimed in claim 5 wherein the attribute information on the sound data of the music piece includes music piece information identifying the music piece, album information identifying an album to which the music piece belongs, artist information identifying an artist of the music piece, and genre information identifying a musical genre of the music piece.

8. A sound recording/reproducing apparatus as claimed in claim 5 wherein the attribute information on the sound data of the music piece includes compression scheme information indicative of a compression scheme with which the sound data are recorded on said recording medium.

9. A sound recording/reproducing method in a sound recording/reproducing apparatus for recording sound data onto a recording medium and reproducing said sound data from said recording medium, the method comprising:

an attribute information recording step of recording, onto said recording medium, attribute information on sound data of a music piece that are to be recorded onto said recording medium;

a rule table creation step of creating a rule table that associates the attribute information, digital signal processor (DSP) program parameters and processing start times, each of the digital signal processor (DSP) program parameters being previously stored in the sound recording/reproducing apparatus and designating a sound field process or a frequency characteristic process, the sound field process or the frequency characteristic process to be performed on a digital signal processor in a connected amplifier apparatus, each of the processing start times designating a time when the sound field process or the frequency characteristic process is started;

a DSP program parameter acquisition step of, at a time of reproduction when sound data of a music piece to be reproduced, read out from said recording medium, are to be outputted to said amplifier apparatus which is currently connected to said sound recording/reproducing apparatus, acquiring, from said rule table, any of the DSP program parameters that corresponds to the attribute information on the sound data and corresponds to any one of the processing start times that has coincided with an elapsed reproducing time of the sound data;

a step of using, when the model of an amplifier apparatus that is the object of control during creation of said rule table and the model of said amplifier apparatus that is currently connected to said sound recording/reproducing apparatus coincide with each other, said DSP program parameter acquired from said rule table as a DSP program parameter after completion of the acquisition process;

a step of acquiring, when the model of an amplifier apparatus that is the object of control during creation of said rule table differs from the model of said amplifier apparatus that is currently connected to said sound recording/reproducing apparatus, a DSP program parameter acquired from said rule table and a DSP program parameter corresponding to said amplifier apparatus that is currently connected to said sound recording/reproducing apparatus from a DSP program associating table that associates DSP program parameters of a plurality of amplifier apparatuses, and using said DSP program parameter acquired from said DSP program associating table as a DSP program parameter after completion of the acquisition process; and a DSP program parameter setting step of setting the DSP program parameter, acquired from said rule table, in said digital signal processor of said amplifier apparatus currently connected to said sound recording/reproducing apparatus, wherein said DSP program parameter setting step sets the DSP program parameter, after completion of the acquisition process, in said digital signal processor of said amplifier apparatus that is currently connected to said sound recording/reproducing apparatus.

10. A sound recording/reproducing apparatus comprising:

a recording medium on which sound data can be recorded and reproduced;

an attribute information recording section that records, onto said recording medium, attribute information on sound data of a music piece that are to be recorded onto said recording medium;

a rule table creation section that creates a rule table that associates digital signal processor (DSP) program parameters, each of the digital signal processor (DSP) program parameters being previously stored in the sound recording/reproducing apparatus and designating a sound field process or a frequency characteristic process, the sound field process or the frequency characteristic process to be performed on a digital signal processor in a connected amplifier apparatus;

a DSP program parameter acquisition section that, at a time of reproduction when sound data of a music piece to be reproduced, read out from said recording medium, are to be outputted to said external amplifier apparatus which is currently connected to said sound recording/reproducing apparatus, acquires, from said rule table, any of the DSP program parameters that corresponds to the attribute information of sound data of a music piece to be reproduced and corresponds to a process start time which coincides with an elapsed reproducing time of the sound data;

a DSP program parameter setting section that sets the DSP program parameter, acquired from said rule table, in said digital signal processor of said amplifier apparatus which is currently connected to said sound recording/reproducing apparatus;

a section that uses, when the model of an amplifier apparatus that is the object of control during creation of said rule table and the model of said amplifier apparatus that is currently connected to said sound recording/reproducing apparatus coincide with each other, said DSP program parameter acquired from said rule table as a DSP program parameter after completion of the acquisition process;

a DSP program associating table associating DSP program parameters of a plurality of amplifier apparatus; and a section that acquires, when the model of an amplifier apparatus that is the object of control during creation of said rule table differs from the model of said amplifier apparatus that is currently connected to said sound recording/reproducing apparatus, a DSP program parameter acquired from said rule table and a DSP program parameter corresponding to said amplifier apparatus that is currently connected to said sound recording/reproducing apparatus from said DSP program associating table as a DSP program parameter acquired from said DSP program associating table as a DSP program parameter after completion of the acquisition process, wherein said DSP program parameter setting section sets the DSP program parameter, after completion of the acquisition process, in said digital signal processor of said amplifier apparatus that is currently connected to said sound recording/reproducing apparatus.

11. A sound recording/reproducing method in a sound recording/reproducing apparatus for recording sound data onto a recording medium and reproducing said sound data from said recording medium, the method comprising:

an attribute information recording step of recording, onto said recording medium, attribute information on sound data of a music piece that are to be recorded onto said recording medium;

a rule table creation step of creating a rule table that associates the attribute information and digital signal processor (DSP) program parameters, each of the digital signal processor (DSP) program parameters being previously stored in the sound recording/reproducing apparatus and designating a sound field process or a frequency characteristic process, the sound field process or the frequency characteristic process to be performed on a digital signal processor in a connected amplifier apparatus;

a DSP program parameter acquisition step of, at a time of reproduction when sound data of a music piece to be reproduced, read out from said recording medium, are to be outputted to said amplifier apparatus that is currently connected to said sound recording/reproducing apparatus, acquiring, from said recording medium, the attribute information on the sound data of the music piece to be reproduced and acquiring, from said rule table, any of the DSP program parameters that corresponds to the attribute information;

a step of using, when a model of an amplifier apparatus that is the object of control during creation of said rule table and a model of said amplifier apparatus that is currently connected to said sound recording/reproducing apparatus coincide with each other, said DSP program parameter acquired from said rule table as a DSP program parameter after completion of the acquisition process; and a DSP program parameter setting step of setting the DSP program parameter, after completion of the acquisition step, in said digital signal processor of said amplifier apparatus that is currently connected to said sound recording/reproducing apparatus.

12. A sound recording/reproducing method in a sound recording/reproducing apparatus, the method comprising:

an attribute information recording step of recording, onto a recording medium, attribute information on sound data of a music piece that are to be recorded onto said recording medium;

a rule table creation section that creates a rule table that associates the attribute information, digital signal processor (DSP) program parameters and processing start times, each of the digital signal processor (DSP) program parameters being previously stored in the sound recording/reproducing apparatus and designating a sound field process or a frequency characteristic process, the sound field process or the frequency characteristic process to be performed on a digital signal processor in a connected amplifier apparatus, each of the processing start times designating a time when the sound field process or the frequency characteristic process is started;

a DSP program parameter acquisition section step of, at a time of reproduction when sound data of a music piece to be reproduced, read out from said recording medium, are to be outputted to said amplifier apparatus, acquiring, from said recording medium, the attribute information on the sound data of the music piece to be reproduced and acquiring, from said rule table, any of the DSP program parameters that corresponds to the attribute information; and a DSP program parameter setting step of setting the DSP program parameter, acquired from said rule table, in said digital signal processor of said amplifier apparatus.

* * * * *